US009911050B2

(12) United States Patent  (10) Patent No.: US 9,911,050 B2
Lynam et al.  (45) Date of Patent: Mar. 6, 2018

(54) DRIVER ACTIVE SAFETY CONTROL SYSTEM FOR VEHICLE

(71) Applicant: MAGNA ELECTRONICS INC., Auburn Hills, MI (US)

(72) Inventors: Niall R. Lynam, Holland, MI (US); Axel Nix, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 87 days.

(21) Appl. No.: 14/845,830

(22) Filed: Sep. 4, 2015

(65) Prior Publication Data

US 2016/0042238 A1 Feb. 11, 2016

Related U.S. Application Data

(63) Continuation of application No. 13/202,005, filed as application No. PCT/US2010/025545 on Feb. 25, 2010, now Pat. No. 9,126,525.

(Continued)

(51) Int. Cl.
*G06K 9/00* (2006.01)
*B60Q 9/00* (2006.01)
(Continued)

(52) U.S. Cl.
CPC ......... *G06K 9/00805* (2013.01); *B60Q 9/005* (2013.01); *B60R 1/00* (2013.01);
(Continued)

(58) Field of Classification Search
CPC ..... B60R 1/00; B60R 2300/105; B60R 11/04; B60R 2300/802; H04N 7/181
(Continued)

(56) References Cited

U.S. PATENT DOCUMENTS 2,632,040 A 3/1953 Rabinow
2,827,594 A 3/1958 Rabinow
(Continued)

FOREIGN PATENT DOCUMENTS

DE 19801884 7/1999
EP 0426503 5/1991
(Continued)

OTHER PUBLICATIONS

G. Wang, D. Renshaw, P.B. Denyer and M. Lu, CMOS Video Cameras, article, 1991, 4 pages, University of Edinburgh, UK.
(Continued)

*Primary Examiner* — Frank Huang
(74) *Attorney, Agent, or Firm* — Gardner, Linn, Burkhart & Flory, LLP

(57) ABSTRACT

A driver active safety control system for a vehicle includes a plurality of image capture sensors, a video display screen, a central driver active safety control module and at least one non-imaging sensor. The control module at least includes an image processor, a vision core and a fusion core. The image processor processes image data captured by and received from at least a forward viewing image capture sensor for at least one of (i) automatic headlamp control, (ii) lane departure warning and (iii) traffic sign recognition. The vision core is operable to manipulate image data captured by and received at least from rearward and sideward viewing image capture sensors to form video images for displaying on the video display screen. The fusion core is operable to process inputs received to enhance control by the control module of a driver assistance system of the equipped vehicle.

32 Claims, 20 Drawing Sheets

- Top View Vision System is based on
  - Multiple cameras with extended Field of View
  - Intelligent ECU with multiple video inputs and capable of executing signal processing for complex multi camera functionalities

Related U.S. Application Data

(60) Provisional application No. 61/180,257, filed on May 21, 2009, provisional application No. 61/174,596, filed on May 1, 2009, provisional application No. 61/156,184, filed on Feb. 27, 2009.

(51) Int. Cl.

| | |
|---|---|
| *B60R 1/00* | (2006.01) |
| *B60R 1/12* | (2006.01) |
| *B60W 10/04* | (2006.01) |
| *B60W 10/18* | (2012.01) |
| *B60W 10/20* | (2006.01) |
| *B60W 40/02* | (2006.01) |
| *B60W 50/00* | (2006.01) |
| *G05D 1/00* | (2006.01) |
| *H04N 5/232* | (2006.01) |
| *H04N 5/247* | (2006.01) |

(52) U.S. Cl.
CPC .............. *B60R 1/12* (2013.01); *B60W 10/04* (2013.01); *B60W 10/18* (2013.01); *B60W 10/20* (2013.01); *B60W 40/02* (2013.01); *B60W 50/0098* (2013.01); *G05D 1/0061* (2013.01); *H04N 5/23293* (2013.01); *H04N 5/247* (2013.01); *B60R 2001/1215* (2013.01); *B60R 2001/1253* (2013.01); *B60R 2300/105* (2013.01); *B60R 2300/302* (2013.01); *B60R 2300/303* (2013.01); *B60R 2300/605* (2013.01); *B60R 2300/607* (2013.01); *B60R 2300/806* (2013.01)

(58) Field of Classification Search
USPC .......................................................... 348/148
See application file for complete search history.

(56) References Cited

U.S. PATENT DOCUMENTS

| | | |
|---|---|---|
| 3,349,394 A | 10/1967 | Carver |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,862,594 A | 9/1989 | Schierbeek et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,937,945 A | 7/1990 | Schofield et al. |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |

(56) References Cited

U.S. PATENT DOCUMENTS

| | | |
|---|---|---|
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,131,154 A | 7/1992 | Schierbeek et al. |
| 5,140,455 A | 8/1992 | Varaprasad et al. |
| 5,142,407 A | 8/1992 | Varaprasad et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,371,659 A | 12/1994 | Pastrick et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,567,360 A | 10/1996 | Varaprasad et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,823,654 A | 10/1998 | Pastrick et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,910,854 A | 6/1999 | Varaprasad et al. |
| 5,914,815 A | 6/1999 | Bos |
| 5,923,027 A | 7/1999 | Stam et al. |

(56) References Cited

U.S. PATENT DOCUMENTS

| | | |
|---|---|---|
| 5,924,212 A | 7/1999 | Domanski |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,002,511 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,154,306 A | 11/2000 | Varaprasad et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,198,409 B1 * | 3/2001 | Schofield .................. B60R 1/12 280/728.1 |
| 6,201,642 B1 | 3/2001 | Bos |
| 6,222,447 B1 | 4/2001 | Schofield et al. |
| 6,222,460 B1 | 4/2001 | DeLine et al. |
| 6,227,689 B1 | 5/2001 | Miller |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,276,821 B1 | 8/2001 | Pastrick et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,315,419 B1 | 11/2001 | Platzer, Jr. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,392,315 B1 * | 5/2002 | Jones .................. F02P 3/053 123/597 |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,590,719 B2 | 7/2003 | Bos |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,720,920 B2 * | 4/2004 | Breed .................. B60N 2/2863 342/357.31 |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,902,284 B2 | 6/2005 | Hutzel et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,593 B2 | 2/2006 | Weller et al. |
| 7,004,606 B2 | 2/2006 | Schofield |
| 7,005,974 B2 | 2/2006 | McMahon et al. |
| 7,012,727 B2 | 3/2006 | Hutzel et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 * | 7/2006 | Lang .................. G01S 15/931 340/435 |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |

(56) References Cited

U.S. PATENT DOCUMENTS

| | | |
|---|---|---|
| 7,184,190 B2 | 2/2007 | McCabe et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,255,451 B2 | 8/2007 | McCabe et al. |
| 7,274,501 B2 | 9/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | De Wind et al. |
| 7,380,948 B2 | 6/2008 | Schofield et al. |
| 7,385,488 B2 | 6/2008 | Kim |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,579,940 B2 * | 8/2009 | Schofield ............ B60C 23/00 340/425.5 |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,626,749 B2 | 12/2009 | Baur et al. |
| 7,639,149 B2 | 12/2009 | Katoh |
| 7,720,580 B2 | 5/2010 | Higgins-Luthman |
| 7,777,611 B2 | 8/2010 | Desai |
| 7,855,755 B2 | 12/2010 | Weller et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 8,027,029 B2 | 9/2011 | Lu et al. |
| 8,058,977 B2 | 11/2011 | Lynam |
| 9,126,525 B2 | 9/2015 | Lynam et al. |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2002/0167589 A1 * | 11/2002 | Schofield ............ B60N 2/002 348/148 |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 * | 6/2005 | Lynam ............ B60R 1/12 359/872 |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2007/0023613 A1 | 2/2007 | Schofield et al. |
| 2007/0073473 A1 * | 3/2007 | Altan ............ G01S 13/726 701/518 |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2007/0181810 A1 * | 8/2007 | Tan ............ G01S 7/4811 250/341.1 |
| 2008/0180529 A1 | 7/2008 | Taylor et al. |
| 2009/0113509 A1 | 4/2009 | Tseng et al. |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |

FOREIGN PATENT DOCUMENTS

| | | |
|---|---|---|
| EP | 0492591 | 7/1992 |
| EP | 0788947 | 8/1997 |
| FR | 2641237 | 7/1990 |
| JP | 59114139 | 7/1984 |
| JP | 6079889 | 5/1985 |
| JP | 6080953 | 5/1985 |
| JP | 6272245 | 5/1987 |
| JP | 62131837 | 6/1987 |
| JP | 6414700 | 1/1989 |
| JP | 1141137 | 6/1989 |
| JP | 4114587 | 4/1992 |
| JP | 0577657 | 3/1993 |
| JP | 5213113 | 8/1993 |
| JP | 6227318 | 8/1994 |
| JP | 06267304 | 9/1994 |
| JP | 06276524 | 9/1994 |
| JP | 06295601 | 10/1994 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| WO | WO198605147 | 9/1986 |
| WO | WO1994019212 | 9/1994 |
| WO | WO1996038319 | 12/1996 |
| WO | WO1997035743 | 10/1997 |
| WO | WO2004047421 | 6/2004 |
| WO | WO2007111984 | 10/2007 |
| WO | WO2008127752 | 10/2008 |
| WO | WO2009036176 | 3/2009 |
| WO | WO2009073054 | 6/2009 |
| WO | WO2011/028686 | 3/2011 |

OTHER PUBLICATIONS

Dana H. Ballard and Christopher M. Brown, Computer Vision, Prentice-Hall, Englewood Cliffs, New Jersey, 5 pages, 1982.

Tokimaru et al., "CMOS Rear-View TV System with CCD Camera", National Technical Report vol. 34, No. 3, pp. 329-336, Jun. 1988 (Japan).

Reexamination Control No. 90/007,519, Reexamination of U.S. Pat. No. 6,222,447, issued to Schofield et al.

Reexamination Control No. 90/007,520, Reexamination of U.S. Pat. No. 5,949,331, issued to Schofield et al.

Reexamination Control No. 90/011,478, Reexamination of U.S. Pat. No. 6,222,447, issued to Schofield et al.

(56) References Cited

OTHER PUBLICATIONS

Reexamination Control No. 90/011,477, Reexamination of U.S. Pat. No. 5,949,331, issued to Schofield et al.
J. Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Vlacic et al., (Eds), "Intelligent Vehicle Tecnologies, Theory and Applications", Society of Automotive Engineers Inc., edited by SAE International, 2001.
International Search Report and Written Opinion for corresponding PCT Application No. PCT/US2010/025545.

\* cited by examiner

Cross-traffic Camera captured picture video output

- Single imager with lens system having extended field of view
  – Mega Pixel CMOS sensor
  – algorithms for image modification captured Field of View displayed Field of View

- Top View Vision System is based on
  - Multiple cameras with extended Field of View
  - Intelligent ECU with multiple video inputs and capable of executing signal processing for complex multi camera functionalities RGB-Z — Combined & Synchronized Vision/Time-of-Flight (TOF) IR Ranging IHC/ILR -> IHC/ILR + Map Data fusion IHC/ILR utilizes knowledge of road curvature and slope, e.g. to predict that disappearing lights of another vehicle are due to vehicle entering a valley and likely to reappear shortly. Improves IHC/ILR performance beyond capabilities of camera alone.

Defined rules how interpret map data and best adjust light control algorithms.
- vehicle is provided with ADAS map data

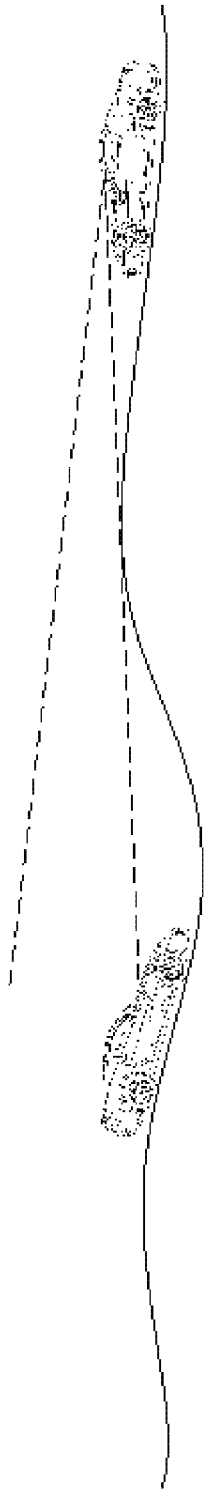

FIG. 15

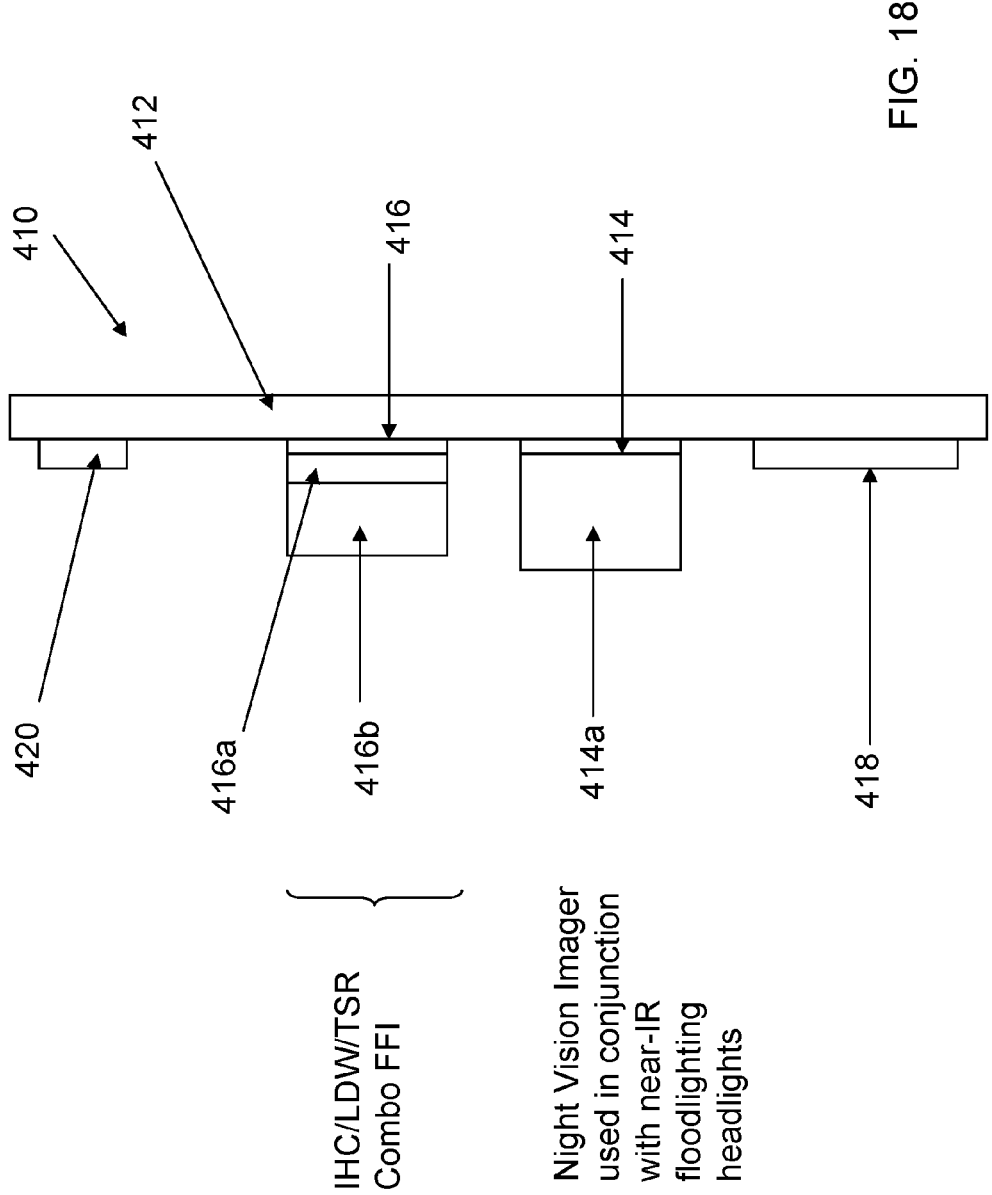

US 9,911,050 B2

DRIVER ACTIVE SAFETY CONTROL SYSTEM FOR VEHICLE

CROSS REFERENCE TO RELATED APPLICATIONS

The present application is a continuation of U.S. patent application Ser. No. 13/202,005, filed Aug. 17, 2011, now U.S. Pat. No. 9,126,525, which is a 371 national phase application of PCT Application No. PCT/US2010/025545, filed Feb. 25, 2010, which claims the benefit of U.S. provisional applications, Ser. No. 61/180,257, filed May 21, 2009; Ser. No. 61/174,596, filed May 1, 2009; and Ser. No. 61/156,184, filed Feb. 27, 2009, which are hereby incorporated herein by reference in their entireties.

FIELD OF THE INVENTION

The present invention relates to rear vision systems for vehicles and, more particularly, to rear vision systems that provide an alert to the driver of a vehicle that an object is detected rearward of the vehicle during a reverse travelling maneuver.

BACKGROUND TO THE INVENTION

It is well known that the act of reversing a vehicle, such as backing out of a garage or driveway or parking space, can be dangerous, particularly if a child or pet wanders behind the vehicle before or during the reversing process. A variety of backup assist systems are known to assist the driver in detecting and/or seeing an object in the rearward path of the vehicle. For example, rear vision systems are known that capture images of a scene rearward of a vehicle (such as during a reverse driving maneuver) and display the images of the rearward scene to the driver of the vehicle to assist the driver during a reverse driving maneuver. Such systems may include a rearward facing camera or image sensor for capturing images of the rearward scene, and may include other types of sensors, such as ultrasonic sensors or radar sensors or the like, which may provide a distance sensing function or proximity sensing function. Examples of such vision and/or imaging systems are described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, which are all hereby incorporated herein by reference in their entireties.

Studies have indicated that drivers, during a reversing act, spend at least about 25 percent or thereabouts of the reverse driving time looking over their right shoulder (for left hand drive vehicles, such as used in the United States), and about 35 percent or thereabouts of the reverse driving time glancing at the rearview mirrors of the vehicle. The studies further indicate that, of the 35 percent of time the driver is viewing the rearview mirrors, the driver typically spends about 15 percent of that time viewing or glancing at the driver side exterior rearview mirror of the vehicle, about 15 percent of that time viewing or glancing at the passenger side exterior rearview mirror of the vehicle, and about 5 percent of that time viewing or glancing at the interior rearview mirror of the vehicle. In spite of the presence of known backup assist systems and rear vision systems, accidents still occur.

SUMMARY OF THE INVENTION

The present invention provides an alert or prompting system for a vehicle equipped with a rear vision system comprising a rear mounted and rear viewing imaging sensor and a video display located in an interior cabin of the vehicle for displaying video images (captured by the rear viewing imaging sensor or camera) to a driver normally operating the vehicle of a scene occurring rearward of the vehicle when the driver is executing a backup reverse maneuver. The alert system alerts the driver of a vehicle that an object is potentially rearward of the vehicle during a backup maneuver. The alert system provides a visual alert device preferably at two or more of the rearview mirrors of the vehicle and alerts the driver that an object has potentially been detected rearward of the vehicle so the driver is alerted or prompted to check and verify the rearward scene on the video display screen that is displaying the images captured by the rear mounted camera or the like while backing up the vehicle, and thus the driver is alerted or prompted to verify whether or not the object that has been at least provisionally being detected presents a hazard or obstacle. The alert system may provide a visual alert device at each or all of the rearview mirror assemblies of the vehicle, such as at an interior rearview mirror assembly, a driver side exterior rearview mirror assembly and a passenger side exterior rearview mirror assembly.

During a reversing maneuver (such as when the driver selects a reverse gear of the vehicle and before and during reverse travel of the vehicle and while the reverse gear of the vehicle is selected), the driver of the reversing vehicle will likely glance at one of the mirror assemblies and thus will likely and readily notice the visible alert when the system is detecting an object (such as via machine vision processing of video image data captured by the rear mounted and rear viewing backup camera itself and/or responsive to non-vision sensors such as a radar sensor or an array of radar sensors and/or such as an ultrasonic sensor or an array of ultrasonic sensors and/or such as an infrared time-of-flight sensor or array of infrared time-of-flight sensors) and the alert devices are thus activated, and thus the driver will recognize that an object has been at least potentially or provisionally detected rearward of the vehicle and will know to or be prompted to look at the video display screen to determine by checking or viewing the displayed video images what the object is and where the object is located relative to the reversing vehicle and whether the object detected presents a potential hazard or obstacle in the contemplated rearward path of travel of the vehicle. Optionally, graphic overlays, such as static or dynamic graphic overlays (such as graphic overlays of the types described in U.S. Pat. Nos. 5,670,935; 5,949,331; 6,222,447; and 6,611,202; and/or PCT Application No. PCT/US08/76022, filed Sep. 11, 2008, which are hereby incorporated herein by reference in their entireties) may augment and aid such determination by the driver.

These and other objects, advantages, purposes and features of the present invention will become apparent upon review of the following specification in conjunction with the drawings.

BRIEF DESCRIPTION OF THE DRAWINGS

FIG. 15 shows a headlamp control feature suitable for use with the active safety and sensing system of FIG. 11;

FIG. 18 is a schematic of an image sensor chip suitable for use with the active safety and sensing system of the present invention.

DESCRIPTION OF THE PREFERRED EMBODIMENTS

Figure 1:
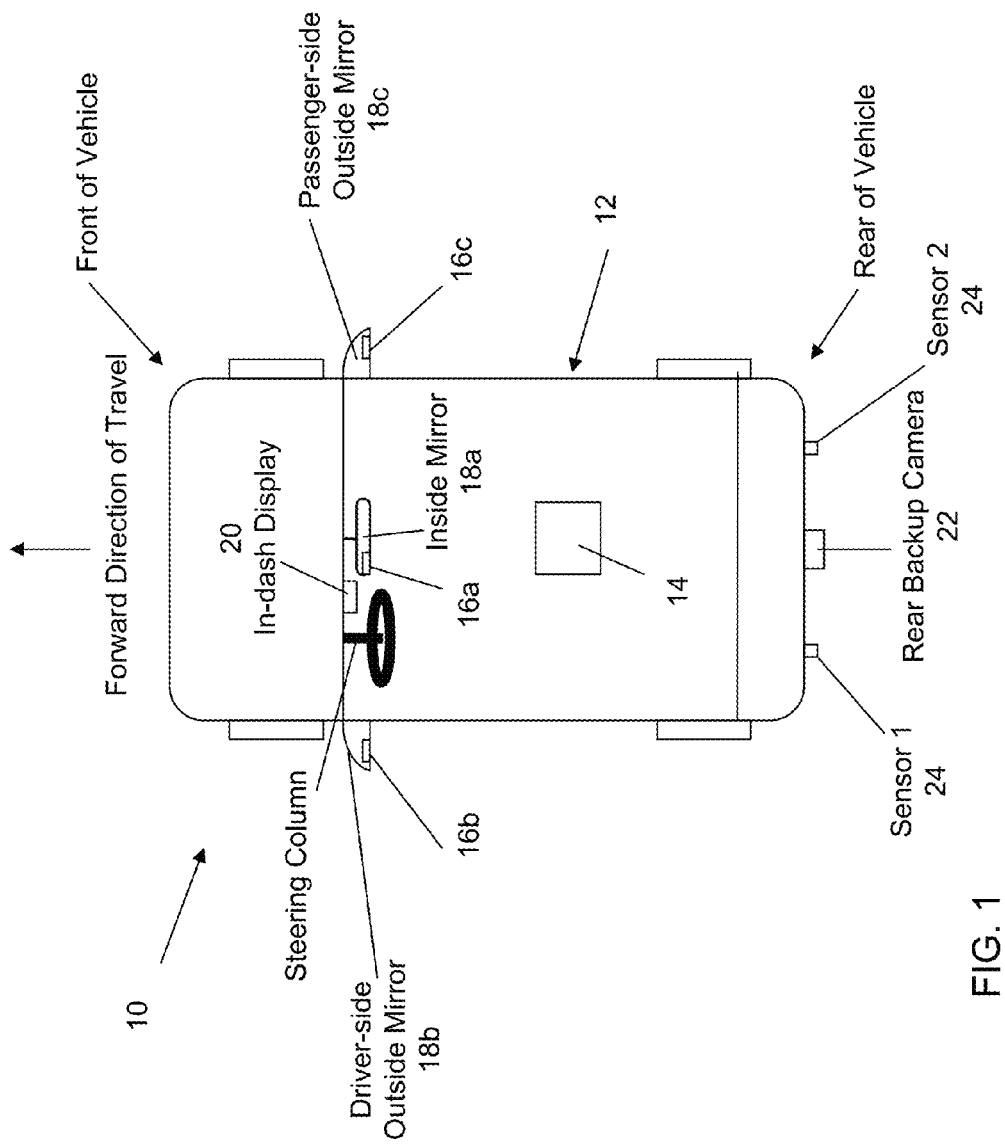
FIG. 1 is a plan view of a vehicle incorporating an alert system in accordance with the present invention.
Figure 2:
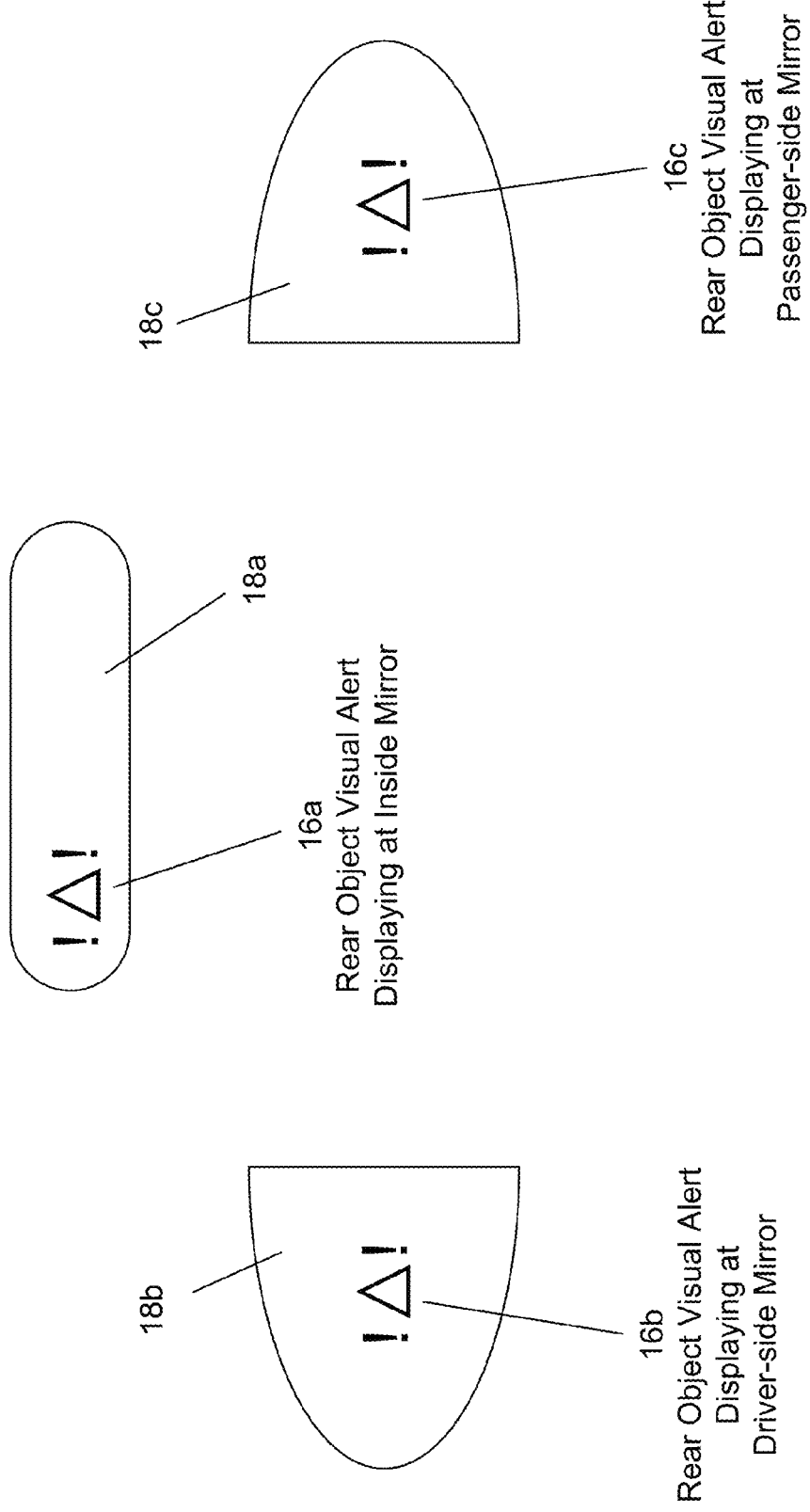
FIG. 2 is a forward facing view with respect to the direction of travel of the vehicle, showing each of the rearview mirrors of the vehicle of FIG. 1 and the alert displayed at the rearview mirrors when an object is detected behind the vehicle during a backup maneuver.

Referring now to the drawings and the illustrative embodiments depicted therein, an alert or prompting system 10 for a vehicle 12 includes a control or processor 14 for determining if an object may be behind the vehicle and/or in the rearward path of the vehicle, and an alert device 16a, 16b, 16c at each of the rearview mirror assemblies 18a, 18b, 18c of the vehicle. The vehicle includes a rear vision system that includes a display 20 (such as a video display screen for displaying video images) within a cabin of the vehicle 12 (such as at the instrument panel of the vehicle or such as at an interior rearview mirror assembly of the vehicle or the like) for viewing by the driver of the vehicle, and a rearward facing camera 22 for capturing images of the scene rearward of the vehicle during a reversing maneuver (such as at or before or after commencement of rearward motion of the vehicle, such as responsive to the driver of the vehicle shifting the gear actuator or selector into a reverse gear position). The video display 20 provides a video image of a scene rearward of the vehicle, such as captured by the rearward facing camera 22. The alert system is operable to actuate at least one of the alert devices 16a-c, and optionally and desirably each of the alert devices 16a-c, when an object is detected rearward of the vehicle and during a reversing maneuver so that the driver, when glancing at one of the rearview mirrors 18a-c, is alerted to the presence of an object rearward of the vehicle, and can then look at or view or check the display 20 to see what the detected object is and where the detected object is relative to the vehicle. The alert system 10 thus enhances the driver's awareness of objects rearward of the vehicle to assist the driver during the reversing maneuver, as discussed in detail below.

In the illustrated embodiment, the alert system 10 is operable to activate the alert devices 16a-c to generate a visible or visual alert preferably at all three rearview mirror assemblies (for example, the interior rearview mirror assembly 18a, the left or driver side exterior rearview mirror assembly 18b, and the right or passenger side exterior rearview mirror assembly 18c) or any subset thereof, so that the driver will likely view or glance at at least one of the visible alerts during a reversing maneuver (because a driver typically spends about 35 percent of the time during a reversing maneuver looking at or viewing a rearview mirror assembly). Upon viewing the visible or visual alert at one or more of the mirror assemblies, the driver is alerted or at least prompted to the potential of an object rearward of the vehicle and thus knows to check or is prompted to check the video display (such as a center stack video display at the instrument panel or center console of the vehicle or a video mirror display at the interior rearview mirror assembly of the vehicle) so that the driver can readily see what the object is and where the object is located with respect to the vehicle by looking at the video display. Optionally, the alert system may include an alert device at each of the exterior rearview mirror assemblies (and not at the interior rearview mirror assembly) to provide an alert to the driver at locations where a driver typically views about 30 percent of the time during a backup maneuver.

Although an additional audible alert may be provided when an object is detected, this is not as desirable as a visible or visual alert since drivers are typically less tolerant of audible alerts and more tolerant of visible alerts or displays. Also, such audible alerts may often provide an alert for something that the driver may consider to be a false alarm. A visual alert is more benign and more tolerated to typical drivers than an audible alert and thus the visual prompts of the present invention may be displayed at a different threshold of sensitivity. For example, typically an audible alert is activated only when the certainty of an accurate detection is at a higher predetermined threshold level, while a visual alert may be displayed at a lower threshold level of certainty. The present invention provides visible alerts and provides them at locations where a driver is likely to look during a reversing maneuver (such as before backing up and upon shifting the vehicle gear actuator into a reverse gear position and during the backing up of the vehicle), in order to enhance the likelihood that the driver will be made aware of a detected object during the reversing maneuver, without a potentially annoying audible alert. Thus, the processor or controller may set a lower detection confidence threshold at which the visual alerts are activated or illuminated and can optionally and preferably reinforce, but at a higher detection confidence threshold, with an audible alert.

The alert devices 16a-c may comprise any suitable visible alert devices, such as iconistic displays or the like, and may be disposed behind the reflective element of the respective mirror assembly so that the alert device, when activated, is viewed by the driver of the vehicle through the reflective element of the side exterior mirror or interior mirror of the vehicle. Optionally, and desirably, the alert devices may comprise display-on-demand display devices that are viewable through partially reflecting and partially transmissive mirror reflectors of transflective reflective elements of the mirror assemblies (such as transflective reflective elements of the types described below). Thus, the alert devices are viewable and discernible to the driver of the vehicle when activated, but are substantially hidden or rendered covert or non-discernible (behind the reflective element) when not activated. Such alert devices thus may be provided as large area displays that are readily visible and viewable when activated, to further enhance the driver's awareness of the alert device when it is activated.

Optionally, the visual alert devices may be disposed behind the reflective element of the mirror assemblies and viewed through an aperture or window established through the mirror reflector (such as via laser ablation or etching of the metallic mirror reflector). Optionally, the visual alert devices may be disposed elsewhere and not necessarily behind the reflective element, such as at a housing or bezel portion of the mirror assemblies (such as by utilizing aspects of the indicators and displays described in U.S. Pat. No. 7,492,281, which is hereby incorporated herein by reference in its entirety) or elsewhere at or in the vehicle and not in the mirror assembly, such as at an A-pillar of the vehicle and near an associated exterior mirror, such that the visual alert device can readily be seen by the driver of the vehicle when he or she is glancing at the mirror assembly. Optionally, additional alert devices may be disposed at other locations on or in the vehicle where a driver may readily view them during the reversing maneuver so as to be prompted to check or look at or view the video display of the rearward scene behind the vehicle.

Optionally, the alert devices or indicators, such as for the exterior rearview mirror assemblies, may utilize aspects of blind spot indicators or the like, such as indicators or light modules of the types described in U.S. Pat. Nos. 7,492,281; 6,227,689; 6,582,109; 5,371,659; 5,497,306; 5,669,699; 5,823,654; 6,176,602; 6,276,821; 6,198,409; 5,929,786; and 5,786,772, and/or U.S. patent applications, Ser. No. 11/226,628, filed Sep. 14, 2005 and published Mar. 23, 2006 as U.S. Publication No. US 2006-0061008; Ser. No. 11/520,193, filed Sep. 13, 2006, now U.S. Pat. No. 7,581,859; and/or Ser. No. 11/912,576, filed Oct. 25, 2007, now U.S. Pat. No. 7,626,749, and/or PCT Application No. PCT/US2006/026148, filed Jul. 5, 2006, and/or PCT Application No. PCT/US07/82099, filed Oct. 22, 2007, and/or PCT Application No. PCT/US2006/018567, filed May 16, 2006 and published Nov. 23, 2006 as International Publication No. WO 2006/124682, which are hereby incorporated herein by reference in their entireties.

Optionally, the visible alert devices may flash or change color or otherwise function in a manner that further draws the driver's attention to the alert so the driver is quickly made aware of the potential hazard rearward of the vehicle so the driver knows to view the video display. Optionally, the visible alert devices may provide different stages of alerts, and may be adjusted or modulated or altered in response to a degree of danger or proximity to the detected object. For example, the alert devices may initially, upon detection of an object several feet from the vehicle, be activated to provide a constant display, and as the vehicle further approaches the detected object, the alert devices may intermittently displayed or flashed and/or the intensity of the alert devices may be increased and/or the alert devices may otherwise be adjusted to enhance the viewability of the display.

Optionally, one of the alert devices may be adjusted relative to the other two alert devices to indicate to the driver the general location of the detected object. For example, if the object is detected toward one side of the vehicle's path, the alert device at the side mirror assembly at that side of the vehicle may be displayed at a greater intensity or may be flashed to further indicate to the driver the general location of the detected object. The other two alert devices would still be activated so that the driver will have a greater chance of noticing the visible alert during the reversing maneuver.

Optionally, the image processor may process the image data to detect an object and/or to classify a detected object (such as to determine if the object is an object of interest or of a particular type or classification, such as a person or the like) and/or to determine a distance to the detected object and/or to detect or determine other characteristics of the object. Optionally, the system may include non-vision sensors 24 (FIG. 1), such as an ultrasonic sensor/array or radar sensor/array or an infrared object detection sensor/array or the like, to detect an object and/or to determine a distance to or proximity of a detected object. The alert system may be responsive to either the image processor or other processor that detects objects either via processing of the captured image data or processing of the outputs of one or more non-vision sensors at the rear of the vehicle.

Thus, during a reversing operation or maneuver of the vehicle, the driver may move the gear actuator or shifter from a "Park" position to a "Reverse" position to commence the reversing maneuver. When the gear actuator is moved to the reverse position, the rearward facing camera and video display may be actuated to display the rearward scene for viewing by the driver of the vehicle. A processor may process the captured image data or output of a rearward detecting sensor to detect objects present in the scene rearward of the vehicle, and the alert system may activate the alert devices responsive to an object being detected. Because during a typical reversing maneuver, a driver may typically spend about 35 percent of his or her time viewing one or more of the rearview mirror assemblies of the vehicle, the alert system of the present invention (which may provide a visible alert at each of the rearview mirror assemblies) substantially increases the likelihood that the driver will be made aware of an object detected rearward of the vehicle during the maneuvering process, and will channel or funnel the driver's attention to check the video screen to see what the detected object is and where it is located relative to the vehicle and the vehicle's rearward path of travel.

Optionally, the output of the rearward facing sensor or system may be processed by an image processor, such as, for example, an EyeQ™ image processing chip available from Mobileye Vision Technologies Ltd. of Jerusalem, Israel. Such image processors include object detection software (such as the types described in U.S. Pat. No. 7,038,577; and/or Ser. No. 11/315,675, filed Dec. 22, 2005, now U.S. Pat. No. 7,720,580, which are hereby incorporated herein by reference in their entireties), and analyze image data to detect objects. The image processor or control may determine if a potentially hazardous condition (such as an object or vehicle or person or child or the like) may exist in the rearward vehicle path and the alert system may, responsive to the processor, generate an alert signal (such as by actuation of the visual indicators or alert devices 16*a-c* and/or an audible indicator or by an enhancement/overlay on a video display screen that is showing a video image to the driver of what the night vision sensor/camera is seeing) to prompt/alert the driver of a potential hazard as needed or appropriate. The alert devices thus may provide an episodal alert so that the driver's attention is channeled or funneled toward the video display when there is a potential hazard detected.

Optionally, the imaging device and/or control circuitry or processor may be part of or share components or circuitry with other image or imaging or vision systems of the vehicle, such as headlamp control systems and/or rain sensing systems and/or cabin monitoring systems and/or the like. For example, the vehicle equipped with the rear vision system and alert system discussed above may also include a forward vision-based system 26 having a forward facing camera (such as at the interior rearview mirror assembly and/or an accessory module or windshield electronics module of the vehicle) and an image processor, such as for use as a lane departure warning system, a headlamp control system, a rain sensor system, an adaptive cruise control system, and/or the like. Because forward and rearward travel of the vehicle are mutually exclusive events and are determined by the movement or shifting of the gear actuator or shifter to the selected forward or reverse gear, the image processor circuitry may be shared by the forward vision system and the rearward vision system. The processor function thus may switch from processing image data captured by the forward facing camera (when the vehicle is in a forward gear) to processing image data captured by the rearward facing camera (when the vehicle is in a reverse gear). Thus, the processing circuitry and components may be shared by the two mutually exclusive systems to provide a common image processor to reduce the costs and complexity of the vehicle and its electronic features.

Figure 3:
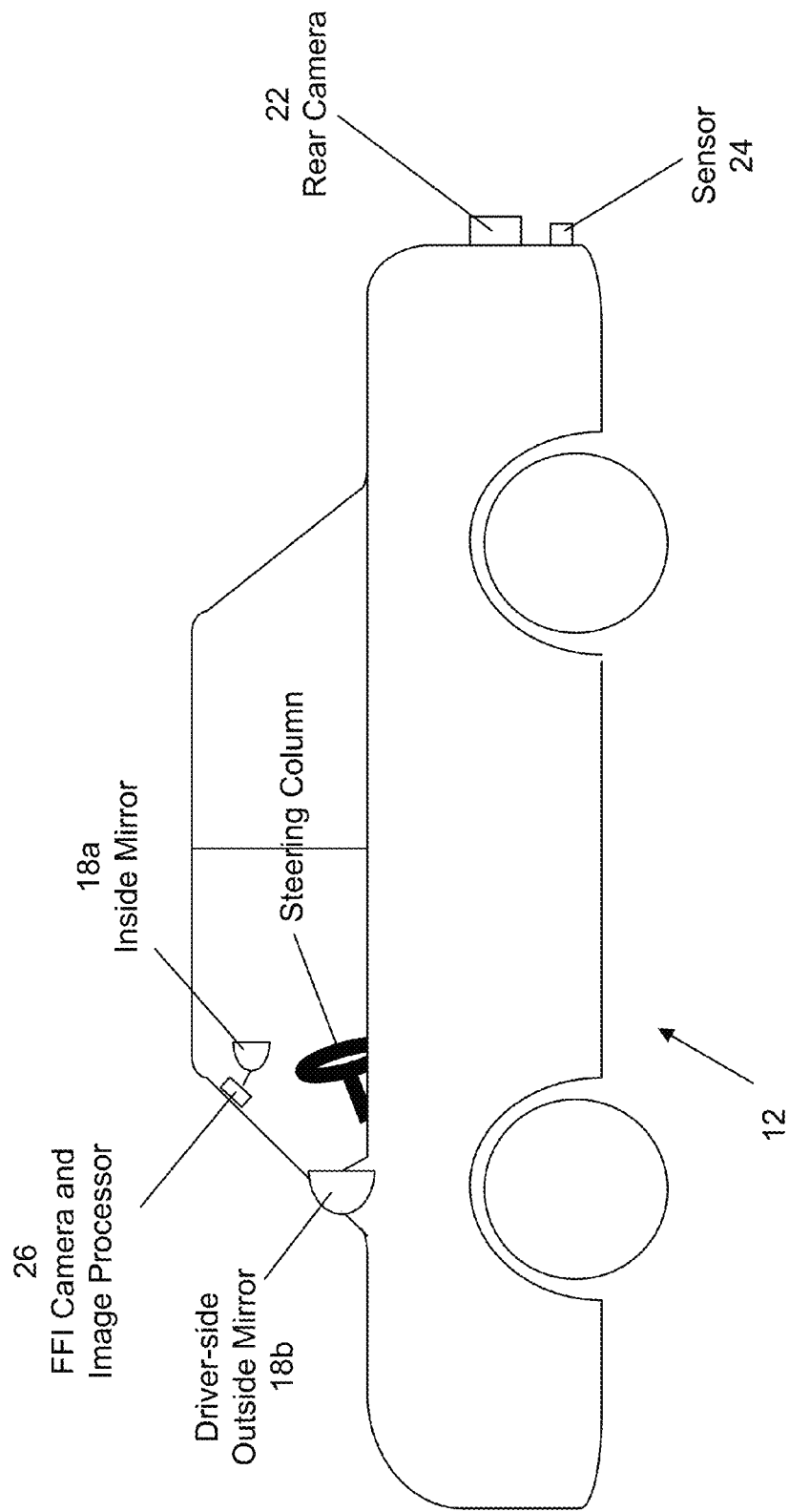
FIG. 3 is a side elevation of a vehicle equipped with an alert system of the present invention and a forward facing vision system.
Figure 4:
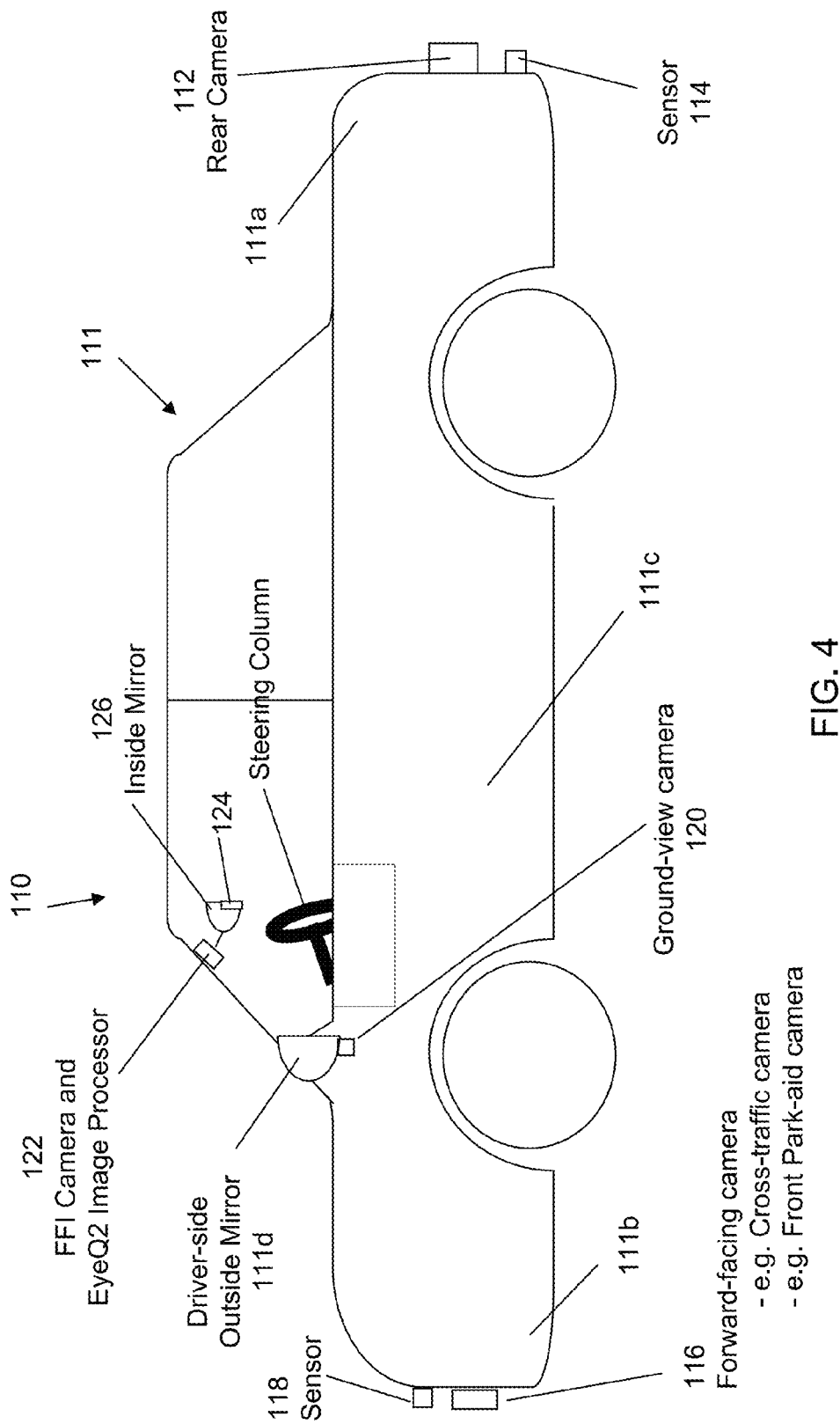
FIG. 4 is a side elevation of a vehicle equipped with an imaging or vision system and display in accordance with the present invention.

For example, and with reference to FIG. 3, a video mirror 18*a* (such as a video mirror of the types described in U.S. Pat. No. 6,690,268, which is hereby incorporated herein by reference in its entirety) may be provided, and with a forward facing imager or imaging system 26 included in a windshield electronics module or in the mirror assembly itself. The forward facing camera or imager can feed to an EyeQ™ image processing chip or equivalent that is adjacently located in the windshield electronics module or interior rearview mirror assembly (or alternatively is located elsewhere in the vehicle, such as at or in an instrument panel of the vehicle or the like). Thus, when the driver is normally operating the vehicle and driving forwardly down the road, the forward facing imaging system 26 can be operable to, for example, control headlamps, detect road markings, detect road signs, and/or the like. However, when the reverse gear of the vehicle is selected at the initiation of the reversing maneuver and before reversing or reverse travel of the vehicle occurs, the video image from the rear mounted and rearward facing camera 22 can be fed or piped, either digitally or as a standard video signal, and either via a wired or wireless link, to the processor to be processed by the EyeQ™ or equivalent image processor circuitry at or near the front of the vehicle. The video image may also be shown, such as on the video mirror (and preferably with graphic overlays or the like), and optionally with potentially hazardous objects being highlighted and/or enhanced due to the image processing by the EyeQ™ image processor. Similarly, the EyeQ™ image processor, as part of the overall control system, may control the visual alerts in any one or all of the rearview mirrors, and preferably may do so with a lower threshold sensitivity for such visual alerts as compared to a threshold sensitivity that may be used with an audible alert. Optionally, the outputs of any rearward facing non-vision sensors 24 (such as a radar sensor or sensors, an ultrasonic sensor or sensors, and/or an infrared time-of-flight (TOF) sensor or sensors or the like) may also be fed to the controller and this can further enhance the accuracy and utility of the object detection and the display to and communication with the driver of the vehicle. Such a system has the commercial advantage that the automaker and/or consumer may purchase only one image processor for both the forward facing imaging (FFI) system or features and the rear facing imaging (RFI) system or features on the vehicle.

Optionally, a vehicle imaging or vision system may be operable to display video images of a scene occurring exteriorly of an equipped vehicle (such as a rearward or forward or sideward scene), such as in response to a user input or a driving condition (such as displaying a rearward video image in response to the driver shifting a gear actuator to a reverse gear position), and may be operable to selectively display other views or otherwise provide an alert in response to an activating event such as image processing of image data from one or more cameras at the vehicle to detect a particular driving condition and/or hazardous condition. The system thus may display human vision video images on a video screen (such as a video mirror utilizing aspects of the video displays described in U.S. Pat. Nos. 7,490,007; 7,446,650; 7,370,983; 7,338,177; 7,274,501; 7,255,451; 7,195,381; 7,184,190; 6,902,284; 6,690,268; 6,428,172; 6,420,975; 5,668,663 and/or 5,724,187, which are hereby incorporated herein by reference in their entireties) visible to the driver of the equipped vehicle when normally operating the equipped vehicle, and may be event triggered to display other images or views and/or to provide an alert or warning (such as a visual alert, such as a graphic overlay electronically superimposed with the video images being displayed on the video screen) or the like in response to a detected event or driving condition and/or hazardous condition. The system of the present invention provides a human vision video display responsive to image data captured by one or more cameras of the vehicle, while the output or outputs of the camera or cameras is, in parallel, being processed by an image processor to machine-vision determine if an object or hazard is within the field of view of the camera and/or if a detected or determined driving condition is a particular type of driving condition, whereby the system may display different images or views and/or may generate an alert or warning or the like to the driver of the vehicle. Optionally, in addition to or as an alternate for such a visual alert, an audible and/or haptic alert may be triggered responsive to the machine-vision image processing determining the potential presence of a person or object that may constitute a hazardous condition when the vehicle is being operated.

For example, and with reference to FIGS. 4-9, a vehicle imaging or vision system 110 includes a rearward facing camera or imaging sensor 112 and a rearward non-imaging sensor 114 (such as a RGB-Z sensor or radar or sonar or ultrasonic sensor or the like) at a rearward portion 111*a* of a vehicle 111, and a forward facing camera or imaging sensor 116 and a forward non-imaging sensor 118 at a forward portion 111*b* of the vehicle 111. Optionally, the system 110 may include a sideward camera or imaging sensor 120 at one or each side 111*c* of the vehicle 111 (such as at a side exterior rearview mirror assembly 111*d* or the like) and with a generally downward and/or sideward field of view. An image processor 122 is operable to process image data from each of the cameras 112, 116, 120 and a display device 124 (such as a video display screen at an interior rearview mirror assembly 126 of the vehicle or the like) is operable to display images (such as video images) responsive to the camera outputs and to the image processor and responsive to a situation or location or event associated with the vehicle as it is driven by the driver, as discussed below. For example, the cameras may generate a video image feed to a graphics engine 125 of or associated with the video display screen 124 (and optionally located elsewhere in the vehicle and remote from the camera and/or the video display screen) for human vision display of the captured images (such as in response to a user input or such as in response to the vehicle actuator being placed in a reverse gear position or the like), while the outputs of the cameras are also in parallel communicated or fed to the image processor 122 (located elsewhere in the vehicle, such as at or associated with the video display screen or at or associated with a separate ECU, such as a Head Unit ECU controller or a Safety ECU controller or a Chassis ECU controller or the like), whereby the image processor processes the image data (such as digital image data) to determine a hazardous condition or a driving situation and whereby the displayed image may be adjusted to display a different view or video image or an alert or output signal may be generated in response to such a determination, as also discussed below. Alternatively, the image processor may be included at the rear camera and the desired graphics may be generated at or adjacent the rear camera 112 itself, and the video feed may include both the images and the desired graphic data and/or other content.

Figures 5A, 5B:
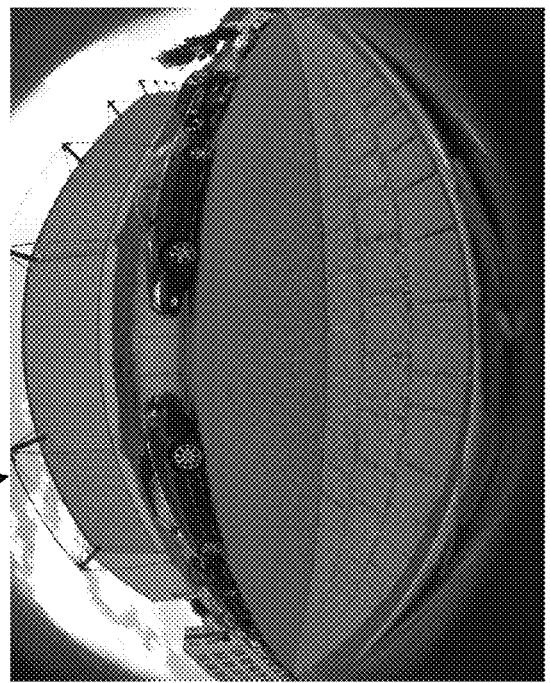
FIG. 5A is a view of a displayed image as captured by a forward facing camera of the vehicle of FIG. 4.
FIG. 5B is a view of a displayed image that is derived from image data of the displayed image of FIG. 5A, as processed to provide sideward views at a cross-traffic situation.
Figure 6A:
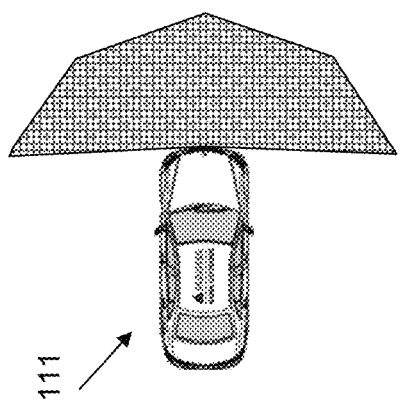
FIG. 6A is a plan view of the vehicle showing the area encompassed by displayed image of FIG. 5A.
Figure 6B:
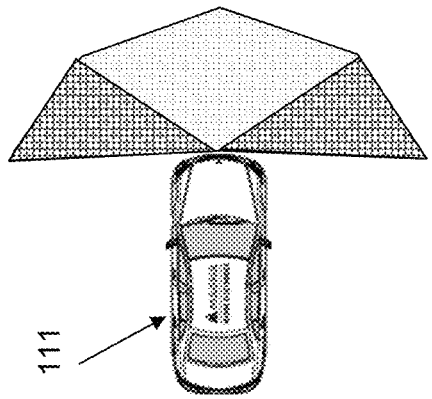
FIG. 6B is a plan view of the vehicle showing the areas encompassed by the displayed images of FIG. 5B.
Figure 7:
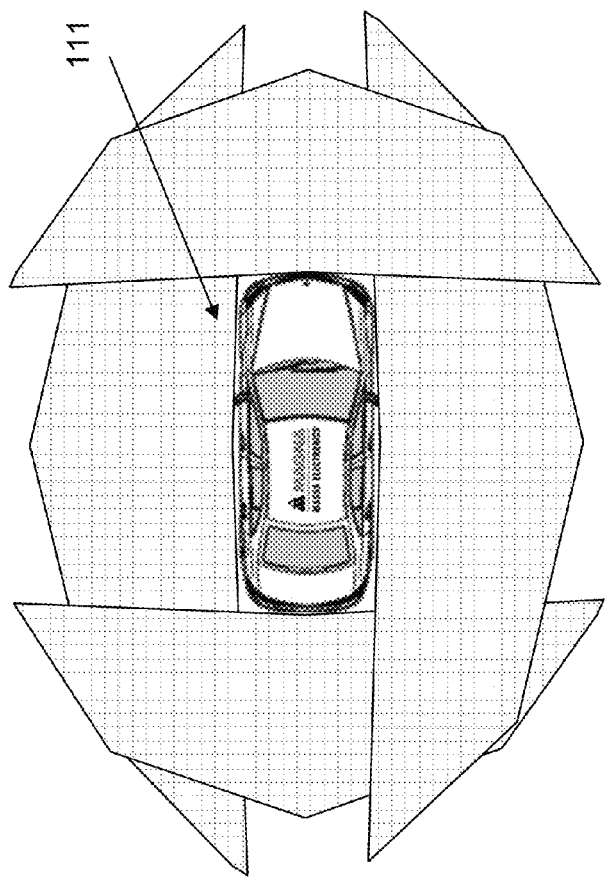
FIG. 7 is a plan view of the equipped vehicle showing the areas encompassed by forward, rearward and sideward cameras of the vehicle.
Figure 8:
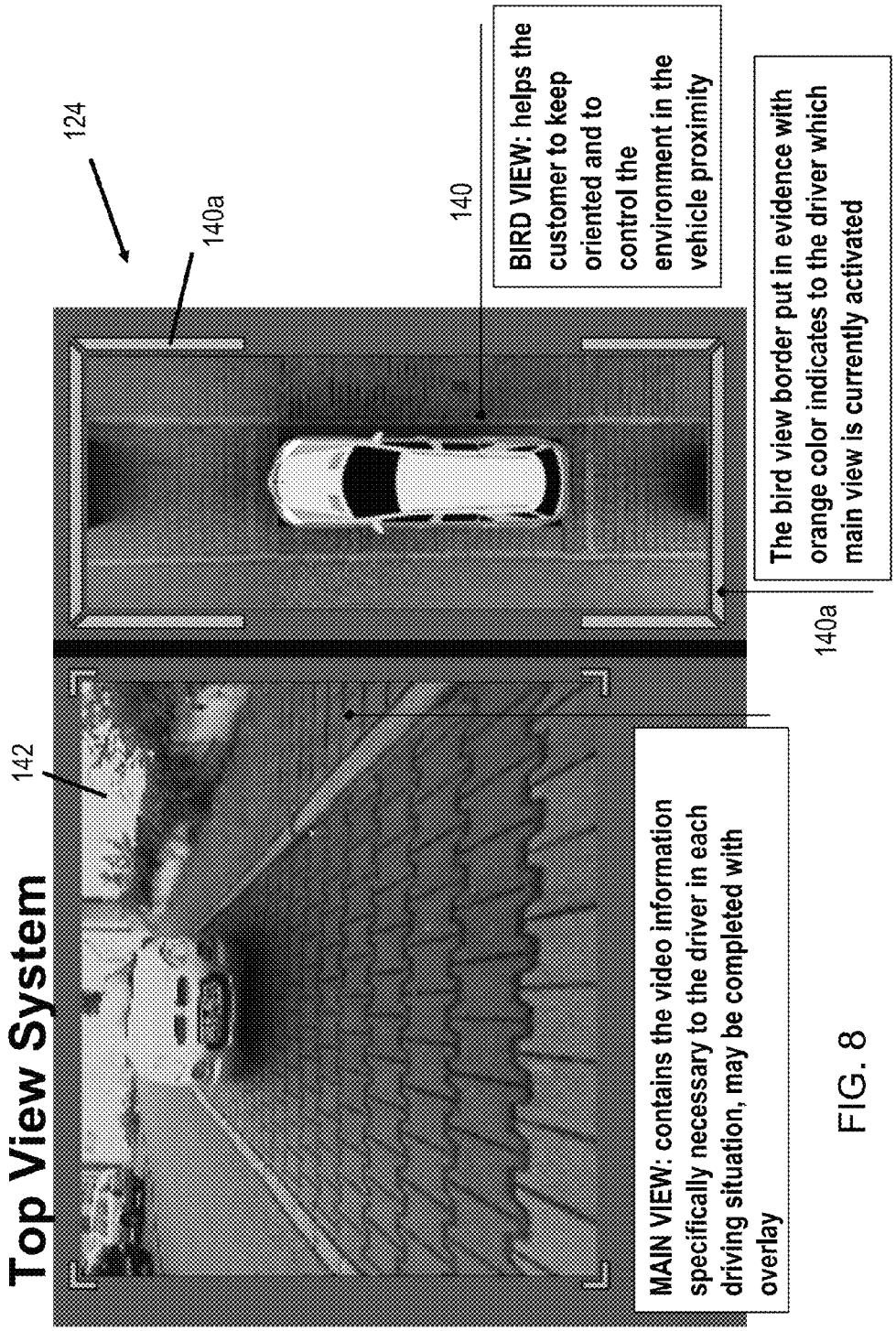
FIG. 8 is a display showing an image captured by a forward or rearward facing camera of the equipped vehicle and a "bird view" of the vehicle.

Forward and rearward and sideward facing cameras 112, 116, 120 may comprise any suitable camera or imaging sensor, preferably comprising a pixelated CCD or CMOS imaging sensor having a plurality of photosensing pixels established on a semiconductor substrate. Preferably, cameras 112, 116, 120 are automotive grade color video cameras. Optionally, and desirably, the cameras may comprise multi-pixel sensors having better image resolution than is provided by VGA-type video cameras. For example, the camera may comprise a pixelated sensor comprising at least a 0.5 Megapixel sensor and more preferably at least a 1 Megapixel sensor or a pixelated imaging sensor having more pixels to provide a desired or appropriate resolution of the captured images. Each of the forward and/or rearward and/or sideward cameras may have a wide angle field of view (such as shown in FIGS. 5A, 6A and 7), and may capture image data representative of a distorted image, whereby image processor 122 may process the captured image data to delineate and correct or account for the distortion (such as shown in FIG. 5B). As shown in FIGS. 5A and 6A, the wide angle field of view of the forward and rearward cameras 112, 116 may extend sidewardly at the front or rear of the vehicle so as to provide a view of the area in front of or behind the vehicle and toward the sides of the vehicle. When a particular condition or event is detected, such as, for example, when it is determined that the vehicle is at a cross-traffic intersection or the like, the video display, responsive to the image processor, may display other views or information, such as the sideward directed views of FIGS. 5B and 6B, to assist the driver in seeing approaching traffic at the cross-traffic intersection or the like. Optionally, the forward and/or rearward camera or cameras may comprise sidewardly facing cameras that capture images towards respective sides of the vehicle, and/or may utilize aspects of the dual camera imaging systems and/or flip-out cameras described in U.S. Pat. Nos. 6,819,231 and 6,989,736, which are hereby incorporated herein by reference in their entireties.

The non-imaging sensors may comprise any suitable sensor, such as ranging sensors that may determine a distance from the vehicle to a detected object or obstacle at or near or forward/rearward/sideward from the vehicle. For example, the non-imaging sensors 114, 118 may comprise an RGB-Z sensor or a radar sensor or a lidar sensor or an infrared sensor (such as an IROD infrared monitoring system or the like) or a laser scanning sensor or a sonar sensor or an ultrasonic sensor or any other suitable sensor that may operate to enhance the evaluation or processing by the system of the area surrounding the equipped vehicle (such as by utilizing aspects of the systems described in U.S. patent applications, Ser. No. 11/721,406, filed Jun. 11, 2007, now U.S. Pat. No. 8,256,821; and/or Ser. No. 12/266,656, filed Nov. 7, 2008, and/or PCT Application No. PCT/US08/51833, filed Jan. 24, 2008 and published Oct. 23, 2008 as International Publication No. WO 2008/127752, which are hereby incorporated herein by reference in their entireties). The system thus may process image data to determine particular driving situations and may detect objects or the like at or near or approaching the vehicle, while the system may also process or receive outputs of the non-imaging sensors to further augment the processing of and the determination of the driving situations and/or any potential hazardous condition or the like.

Figure 10:
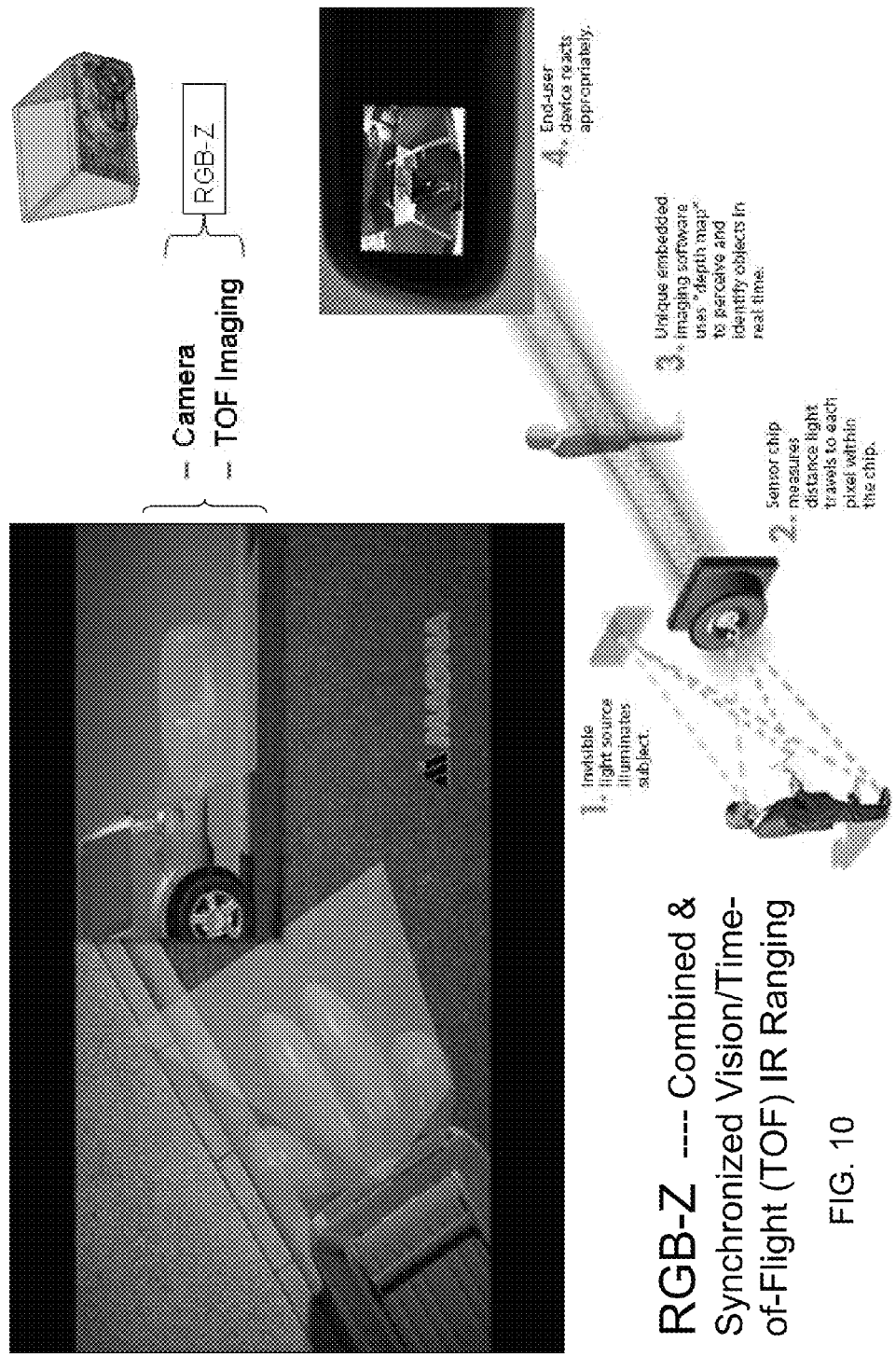
FIG. 10 is a schematic of an RGB-Z sensing system suitable for use with the vision and/or alert system of the present invention.

Optionally, the sensor may comprise a RGB-Z sensor. As illustrated in FIG. 10, RGB-Z combines and synchronizes video imaging with time-of-flight (TOF) 3D sensing. Such 3D sensing typically uses an array of infrared (IR) emitting light emitting diodes (LEDs) or IR floodlighting using an IR laser diode in conjunction with an array of IR-sensitive photo sensors, such as is available from Canesta Incorporated, Sunnyvale Calif., and such as described in Automotive Engineering International (June 2006, pages 34-35), and in U.S. Pat. Nos. 6,323,942 and 6,580,496, which are all hereby incorporated herein by reference in their entireties. RGB-Z can be used for rear backup systems and for forward imaging systems, such as for forward parking systems and for pedestrian detection and/or the like. Optionally, the present invention, preferably in conjunction with RGB-Z, can also be used for side/ground detection such as for the "Japan-view" imaging systems now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle.

The cameras may communicate the captured image data to the graphics engine 125 and to the shared or common image processor via any suitable means. For example, the cameras may wirelessly communicate the captured image data to the image processor or may communicate via a wired connection or communication link or Ethernet cable or link. For economy, video image transmission via an Ethernet cable can be desirable, particularly when the individual video feeds from multiple video cameras disposed around the vehicle are being fed to a common image processor and/or electronic control unit and/or video display module or system. Optionally, for example, the connection or link between the image processor and the camera or cameras may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY®, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, the image processor may be disposed at or in or near the interior rearview mirror assembly of the vehicle, or may be disposed elsewhere in the vehicle. The image processor may comprise any suitable image processor, such as, for example, an EyeQ2 or an EyeQ1 image processing chip available from Mobileye Vision Technologies Ltd. of Jerusalem, Israel, such as discussed above. Optionally, the image processor may comprise a part of or may be incorporated in a safety electronic control unit (ECU) of the vehicle, or a chassis ECU or navigational ECU or informational ECU or head unit ECU or the like, while remaining within the spirit and scope of the present invention. Optionally, the processor or ECU (such as a head unit ECU of the mirror assembly or the like) may receive inputs from a navigation system or audio system or telematics system or the like, and may process such inputs for the associated controls or features of that system, while also processing image data from the cameras for the display feature of the imaging system. Preferably, the image processor (and associated circuitry, such as memory, network connections, video decoders and/or the like) may be incorporated into the likes of a Head Unit ECU or the like in a modular fashion, so as to facilitate inclusion or non-inclusion by the vehicle manufacturer/Tier 1 supplier of the image processing capability and function of the present invention into the overall Head Unit ECU or the like.

Figure 9:
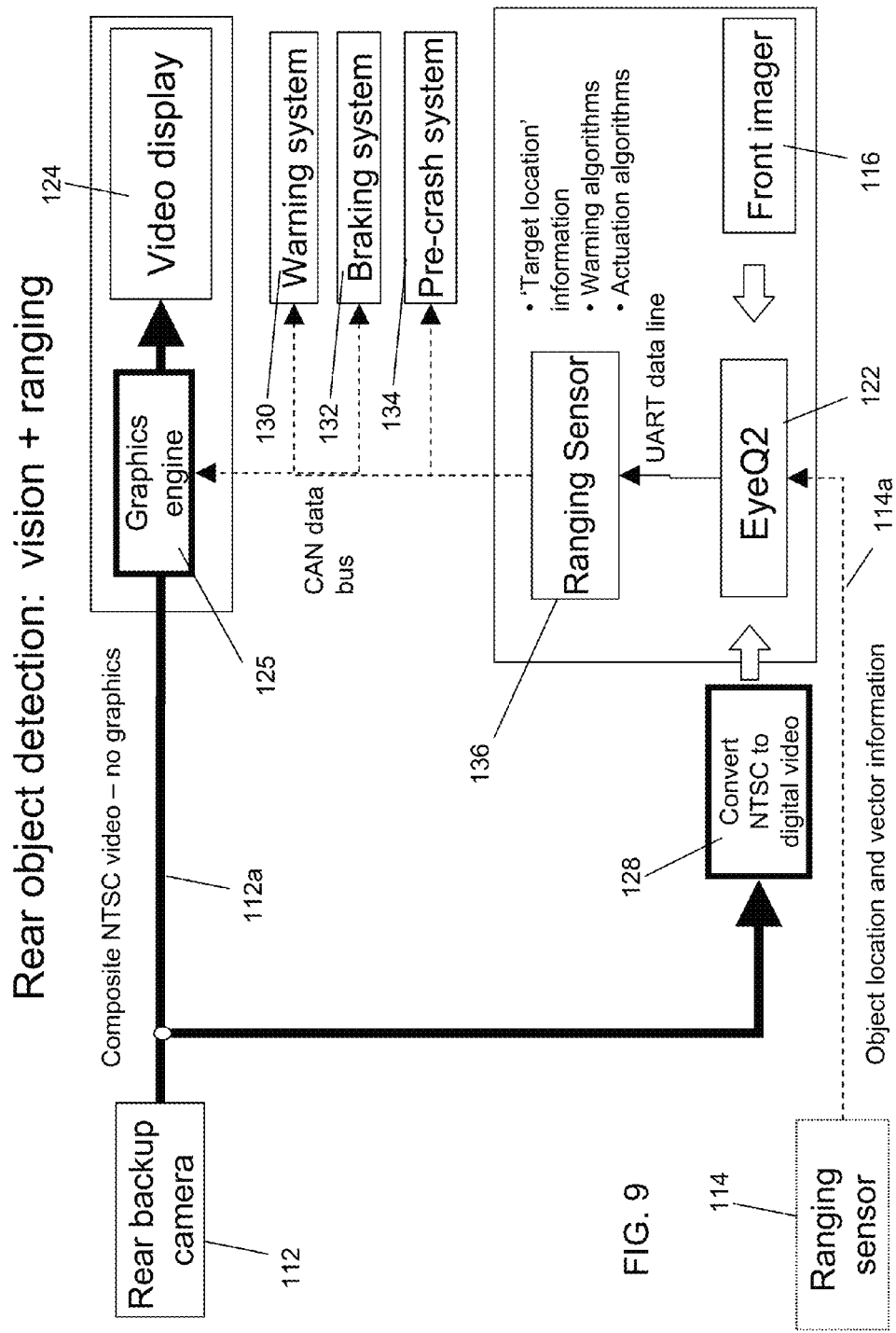
FIG. 9 is a schematic of an imaging or vision or detection system in accordance with the present invention.

In the illustrated embodiment, and with reference to FIG. 9, the rearward backup camera 112 (the forward and/or sideward cameras may function in a similar manner) may output a composite NTSC video signal 112a (or alternatively another standard protocol video signal, depending on the particular application of the imaging or vision system), which may be communicated to the graphics engine 125 for display of the human vision or non-processed or non-manipulated captured video images at video display 124. Thus, the driver of the vehicle may view the human vision wide angle video images of the scene occurring at and to the rear of the vehicle, such as in response to a user input or in response to the driver shifting the reverse gear actuator to a reverse gear position or the like.

The NTSC video signal 112a of the backup camera 112 may also be communicated to a converter 128 that converts the NTSC video signal to a digital video signal, with the digital video signal being input to the image processor 122. The image processor may process the digital image data to determine if an object is present or a hazard exists to the rear of the vehicle (such as by detecting the presence of an object, such as a child or bicycle or the like behind the vehicle). Optionally, the image processor 122 may also receive an input 114a from a ranging sensor 114 that is operable to determine a distance from the rear of the vehicle to an object present behind the vehicle. If the image processor determines that a hazard exists (such as by detecting an object and determining that the detected object is within a threshold distance from the rear of the vehicle), the image processor may generate an output signal that is received by the graphics engine, whereby the video display 124 displays an appropriate image (such as a sideward image or center image that encompasses the detected object or such as a graphic overlay highlighting the detected object or the like) in response to the graphics engine 125. Optionally, the image processor may generate and communicate and output to one or more other systems, such as a warning system 130, a braking system 132 and/or a pre-crash system 134 or the like, in response to a detected hazard and/or driving condition. The image processor may also function to detect a driving condition or event, such as the vehicle approaching and stopping at a cross-traffic intersection or the like, and may generate an output to the graphics engine 125 so that modified video images (such as sideward views or different video images) are displayed to the driver when a respective particular driving condition or event is detected. Such detection of a particular event is desirably achieved by the image processor in conjunction with other vehicle functions/sensors that tell the overall system whether, for example, the vehicle is stopped or is moving, the vehicle is stopped after having been moving, the vehicle is stopped following a deceleration typical for a vehicle approaching and stopping at an intersection or the like during the likes of urban driving, and/or the like. Optionally, the output of the image processor may be received (such as via a UART data line or the like) and processed by a ranging sensor 136 to determine a distance to the detected object in the rearward scene.

Thus, the imaging system may provide a human vision video display (displaying video images of the scene occurring exteriorly of the vehicle as captured by the wide angle rearward facing camera), while also providing image processing of captured image data to determine if an object is present behind the vehicle and/or if a hazard exists during the reversing process, and/or if the vehicle is encountering a particular driving condition or event, whereby the display device or video display screen may display an appropriate alert or image or graphic overlay or modified video image in response to such a detection. The imaging system thus provides a convergence or merging of a human vision video display and digital image processing to provide enhanced display and/or alert features to a driver of the equipped vehicle. Thus, the video display displays video information specifically tailored for the particular driving situation of the vehicle, so that the driver is provided with video information necessary to or desired by the driver in each driving situation.

The image processor 122 is operable to process image data from each camera and may provide an output to the display device that is indicative of various features of the captured images. For example, the image processor may process the forward camera image data to provide two sideward images (such as shown in FIG. 5B), such as in response to a determination by the system that the vehicle is at a cross-traffic driving situation or intersection (such as in response to a detection that the vehicle has stopped after driving forward and/or in response to a detection of a traffic sign, such as a stop sign or the like, and a non-moving condition of the vehicle, and/or the like). The system may operate to display a desired or appropriate video image (or images) for viewing by the driver of the vehicle as the driver is normally operating the vehicle, responsive to an event or situation or driving condition or detected condition or hazard or the like. Because various driving conditions or situations are mutually exclusive and because a driver typically would want to view different areas when in different driving situations (such as driving forward, driving rearward, stopping at an intersection or the like), the image processor and system may provide or display the desired or appropriate video images to the driver responsive to the system determining the driving situation of the vehicle.

For example, if the vehicle is reversing or is about to reverse (such as when the driver moves the gear actuator to a reverse gear position), the video display may display the wide angle rearward field of view to the driver of the vehicle, such as in response to the driver placing the reverse gear actuator in the reverse gear position of the vehicle. As well as being fed directly to the video screen viewable by the driver executing the reversing maneuver, the video feed is also fed in parallel to the image processor (such as the likes of an EyeQ2 image processor or the like) where frames of the image data being captured are machine-vision analyzed for characteristics or classifications indicative or representative of the likes of a child or other person or object of potential interest or hazard present in the rearward path of the vehicle. If an object or hazard is even potentially detected rearward of the vehicle (such as by such image processing of the captured image data to detect an object and/or by determining a distance to a detected object or the like), the video display (responsive to the image processor) may display a different field of view (such as a view that focuses or enlarges the area at which the object is detected) and/or may highlight the detected object (such as via a color overlay or flashing of the object or the like) and/or the system may otherwise provide an alert or warning to the driver of the vehicle and/or the system may visually highlight the potentially detected object present in the video scene being displayed on the video screen to the driver of the vehicle.

Optionally, for example, if the vehicle is being driven in a forward direction, the forward facing camera may be operating to capture images for a lane departure warning system (LDW) or the like, with the captured image data being processed accordingly (such as by utilizing aspects of the systems described in U.S. Pat. Nos. 7,355,524; 7,205,904; 7,038,577; 5,929,786 and/or 5,786,772, and/or U.S. patent applications, Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, which are hereby incorporated herein by reference in their entireties). If the vehicle is then stopped, the system, responsive to the changed driving condition, may determine that the vehicle is stopped at a cross-traffic situation, such as via image processing to detect a stop sign or the like (such as by utilizing aspects of the systems described in U.S. Pat. Nos. 5,550,677; 5,670,935; 5,796,094; 5,877,897; 6,313,454; 6,353,392 6,396,397; 6,498,620; 7,004,606; 7,038,577; and/or 7,526,103, which are hereby incorporated herein by reference in their entireties) or by determining that the vehicle had been driving in a forward direction and then stopped moving. In response to such a determination that the vehicle is stopped at a cross-traffic situation, the video display, responsive to the image processor, may display the sideward directed views (see FIGS. 5B and 6B) to assist the driver in driving forward into the intersection or out of a parking space in a parking lot or the like.

Optionally, for example, when a vehicle equipped with the vision system of the present invention is driving forward along a road, a traffic sign recognition algorithm can recognize a stop sign in the scene ahead of the vehicle, and the system may alert the driver to the presence of the stop sign. When the driver stops at the crossroad, both based on image processing analysis of the video image and on other vehicular feeds, the system automatically knows that the vehicle is stopped at a crossroad. The forward image processing system of the present invention thus automatically views and analyzes the video images captured of the left and right approaching cross traffic, and should the driver commence to move from the stopped or near-stopped or rolling-stopped condition at the crossroad, the image processor and system can at minimum visually alert the driver via graphic enhancement to draw the attention to the driver of a left or right approaching vehicle.

Use of a common image processor for a rear reversing event and for another event, such as stopping at a crossroad or the like, provides machine-vision processing of the captured image data for a particular driving condition or event. Given that the particular driving conditions (such as, for example, reversing maneuvers and stopping at a crossroad) can be and are mutually exclusive, a common or shared image processor can process the received image data in a manner appropriate for the detected condition, with the common image processor fed with video image feeds from a plurality of video imagers/cameras disposed on and around the vehicle (typically with their fields of view external of the vehicle). For example, if the vehicle is reversing or about to reverse, the image processor can process the captured image data captured by the rearward facing camera to determine if there is an object of interest rearward of the vehicle and in the rearward path of the vehicle, while if the vehicle is stopped at a crossroad, the image processor can process the sideward views of the forward facing camera to determine if vehicles are approaching the intersection from the left or right of the equipped vehicle.

Optionally, the vision system may process the captured image data and/or may be associated with a navigation system to determine the location of the vehicle, such as to determine if the vehicle is in an urban environment or rural environment or the like. The navigation system may comprise any type of navigation system, and may utilize aspects of the systems described in U.S. Pat. Nos. 6,477,464; 5,924,212; 4,862,594; 4,937,945; 5,131,154; 5,255,442; 5,632,092; 7,004,593; 6,678,614; 7,167,796; and/or 6,946,978, which are all hereby incorporated herein by reference in their entireties. Optionally, the vehicle speed may be determined via processing of the images captured by the imaging sensors or cameras, such as by utilizing aspects of the systems described in U.S. Pat. No. 7,038,577, which is hereby incorporated herein by reference in its entirety. The system thus may take into account the driving conditions or geographic location of the vehicle in making the decision of whether or not to display the sideward views when it is determined that the vehicle has stopped at a potential cross-traffic driving situation.

Optionally, the system may determine that the vehicle is in or at another driving condition, such as, for example, a parallel parking situation. Such a condition may be determined by processing the captured image data and detecting the equipped vehicle being driven alongside a vacant parking space and being shifted into reverse to back into the vacant parking space. In such a situation, and with reference to FIGS. 7 and 8, the video display 124 may provide an overview 140 of the vehicle (such as an iconistic representation of the vehicle showing the distances to vehicles or objects forward and rearward of the equipped vehicle, such as in a known manner). The image processor may process the captured image data from multiple cameras (such as forward facing camera 116, rearward facing camera 112 and opposite sideward facing cameras 120) to determine the location of and distance to objects at or near or surrounding the vehicle. The video display may also provide a main video view or image 142 that displays to the driver video images of the area immediately forward or rearward of the vehicle (such as in response to the gear shifter or actuator of the vehicle being placed in a forward or reverse gear position). Thus, the main view 142 at the video display provides video information specifically necessary to or desired by the driver during the parking maneuver (or during pulling out of the parking space), and optionally may include a graphic overlay, such as a distance indicator or alert indicator or the like, to further assist the driver during the vehicle maneuvering situation. Optionally, the bird view or overview 140 of the vehicle may include border overlays or indicators 140a that are selectively actuated or illuminated or highlighted to indicate to the driver which view the main display 142 is currently displaying to the driver of the vehicle. The video display thus provides a top view of the vehicle while processing image data from the exteriorly directed cameras and sensors to determine and display or flag or highlight locations where the system detects a potential hazard or the like.

Thus, the vision system of the present invention provides a human vision video display of the scene occurring forward and/or rearward and/or sideward of the vehicle to assist the driver during appropriate or respective driving conditions or situations, such as reversing maneuvers, lane changes, parking maneuvers and the like. The vision system processes captured image data and automatically displays the appropriate video images for the detected particular driving condition in which the vehicle is being driven. If particular events are detected, such as a cross-traffic situation or a hazardous reversing situation or a parking situation or the like, the system automatically switches the video display to display video images or information more suitable to the driver during the particular detected driving situation. Thus, the vision system of the present invention merges the human vision video display and image processing to provide enhanced information display to the driver during particular driving conditions. The system thus can know when the vehicle stops or is otherwise in a particular driving situation and can display or flag on the video screen information pertinent to the driver for the detected particular driving situation and/or can otherwise alert the driver of a potential hazard or the like. The system thus is event triggered and/or hazard detection triggered to provide an appropriate or desired or necessary view or information to the driver depending on the particular driving situation and detected object and/or hazard at or near or approaching the equipped vehicle.

Figure 11:
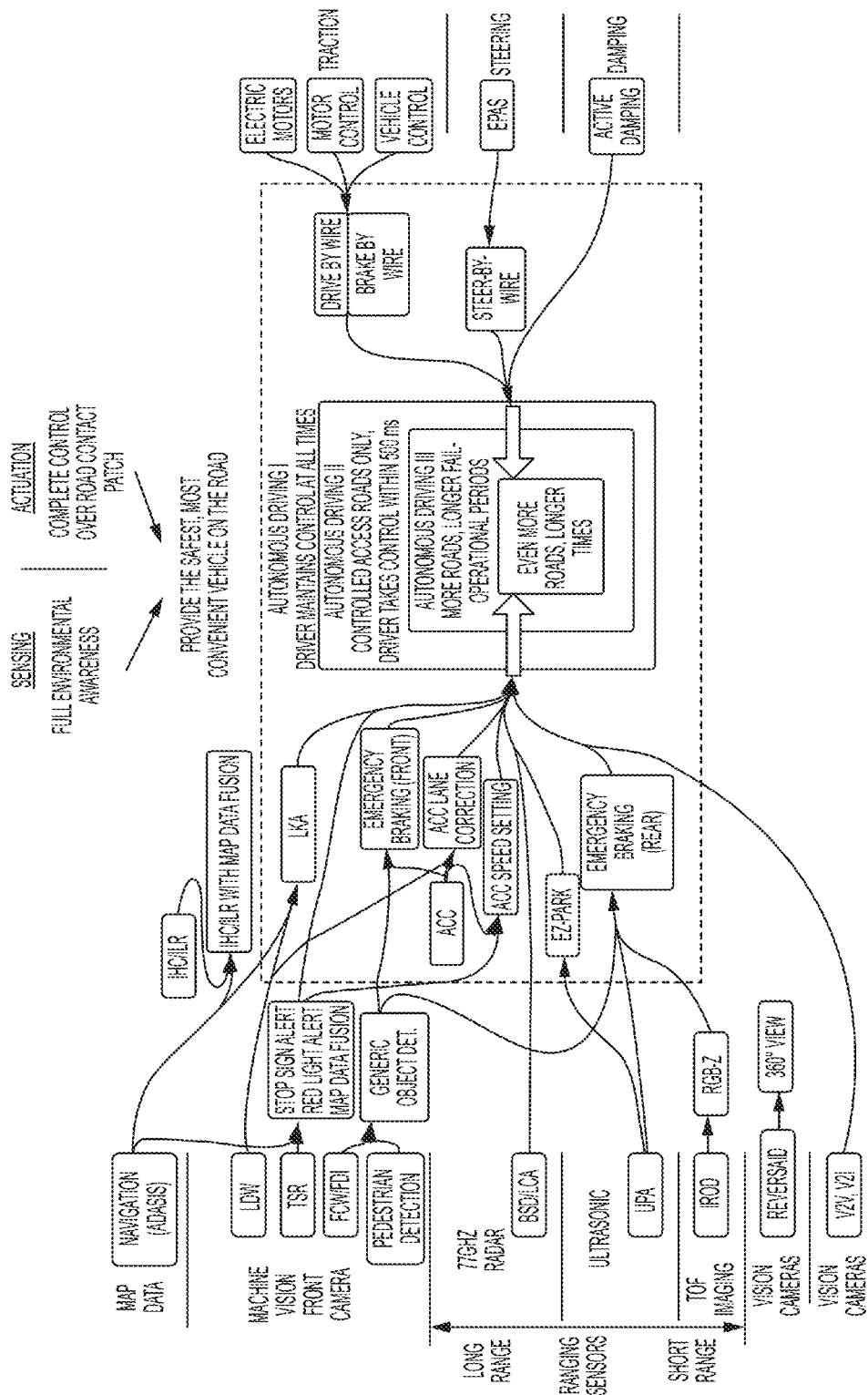
FIG. 11 is a schematic of an active safety and sensing system in accordance with the present invention.
Figure 12:
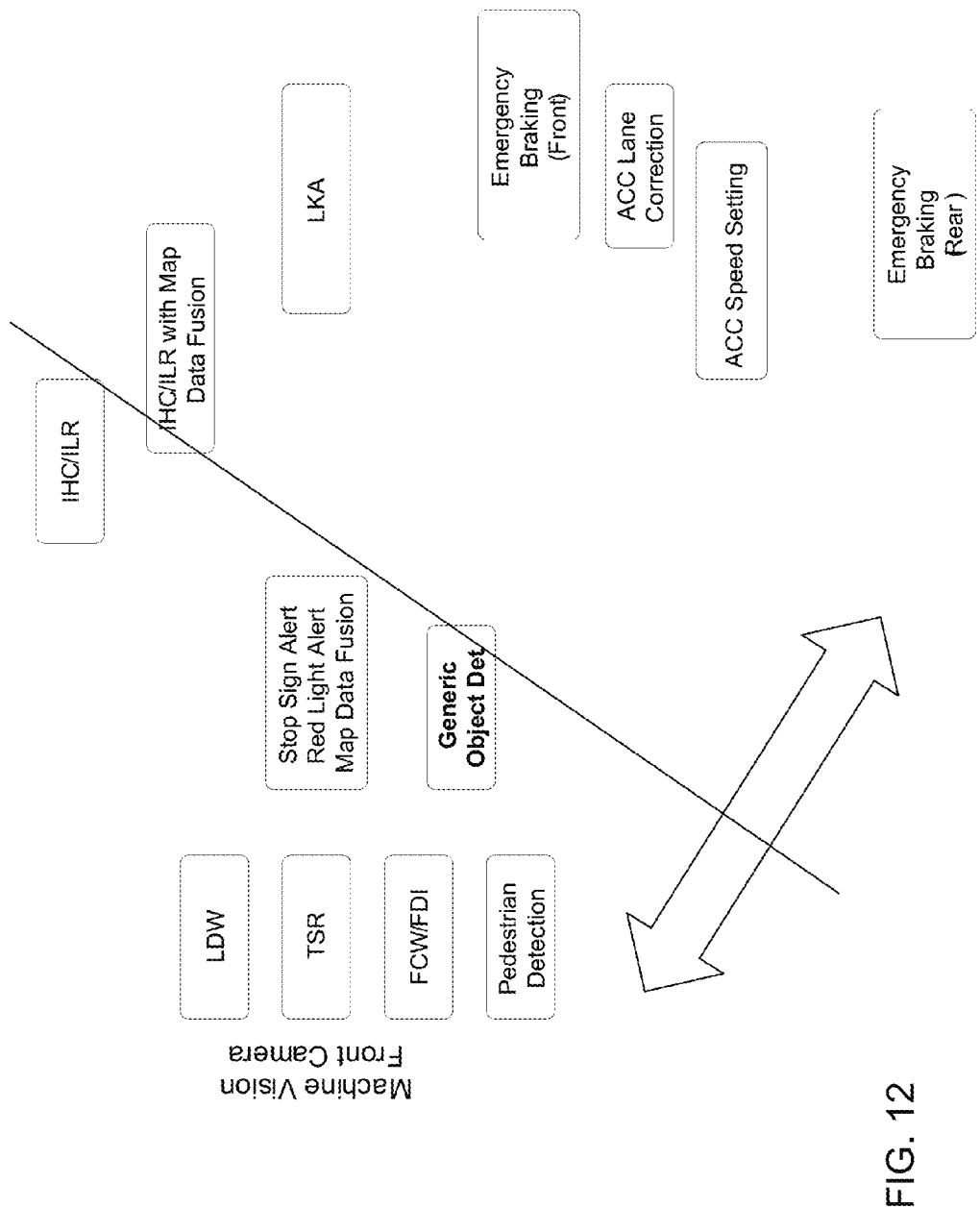
FIG. 12 is a schematic of various sub-systems of the active safety and sensing system of FIG. 11.
Figure 13:
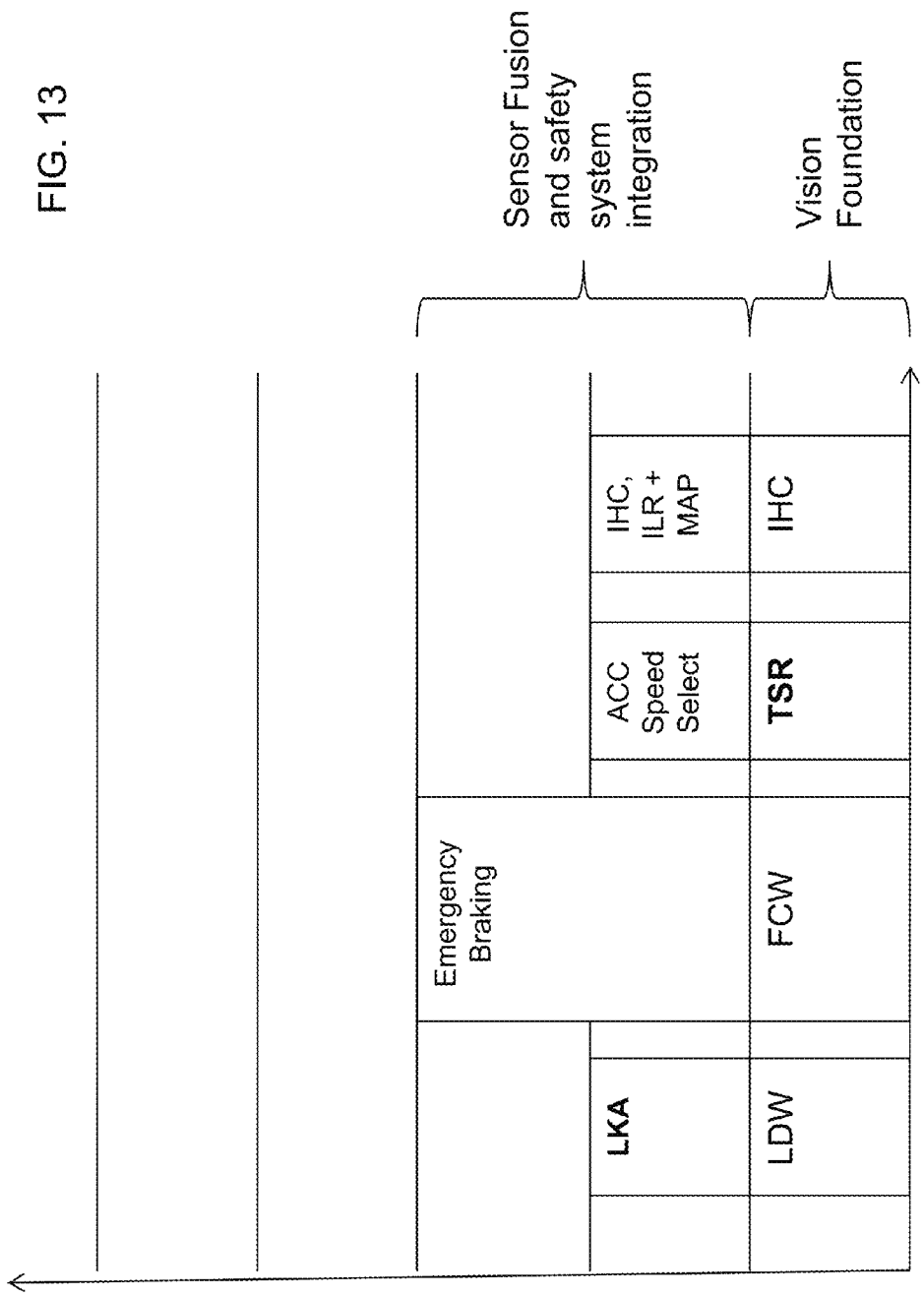
FIG. 13 is a chart showing relationships between sub-systems of the active safety and sensing system of FIG. 11.

The system of the present invention may be part of an overall active safety and sensing system, such as the active safety and sensing system shown in FIG. 11. As discussed above, and as illustrated in FIGS. 11 and 12, the system may comprise the combination of machine vision activity or monitoring (such as for a lane departure warning system and/or the like) and vehicle control (such as via body/chassis sensors and sensing). As shown in FIG. 11, the active safety and sensing system may include fusion/combination of outputs from various sensing devices (such as a vision-based or camera-based or image-based sensing system and a non-image-based sensing system) to provide environmental awareness at and surrounding the vehicle and may provide partial or complete control of the vehicle as it is driven along a road and/or may provide alert warnings to the driver of the vehicle of what may be present environmentally exterior of the vehicle and/or what may be hazardous thereat. Machine vision forward facing cameras may be used to provide lane departure warning (LDW), traffic sign recognition (TSR), forward collision warning (FCW), pedestrian detection, vehicle detection, hazard detection and/or the like, and these systems may communicate with or cooperate with other systems, such as intelligent headlamp control or automatic headlamp control (AHC), intelligent light ranging (ILR) (a combination of AHC and ILR may be used for a glide path automatic headlamp control, for example, where the headlamps are actively or dynamically adjusted so that the beam pattern forward of the equipped vehicle can be configured to illuminate the road just ahead of an approaching vehicle), lane keep assist (LKA) (where the steering wheel may variably provide resistance to turning to further alert the driver of a detected potentially hazardous condition and/or may actively turn or control the steering system of the vehicle so as to mitigate or avoid an imminent potential collision) and/or the like.

Figure 14:
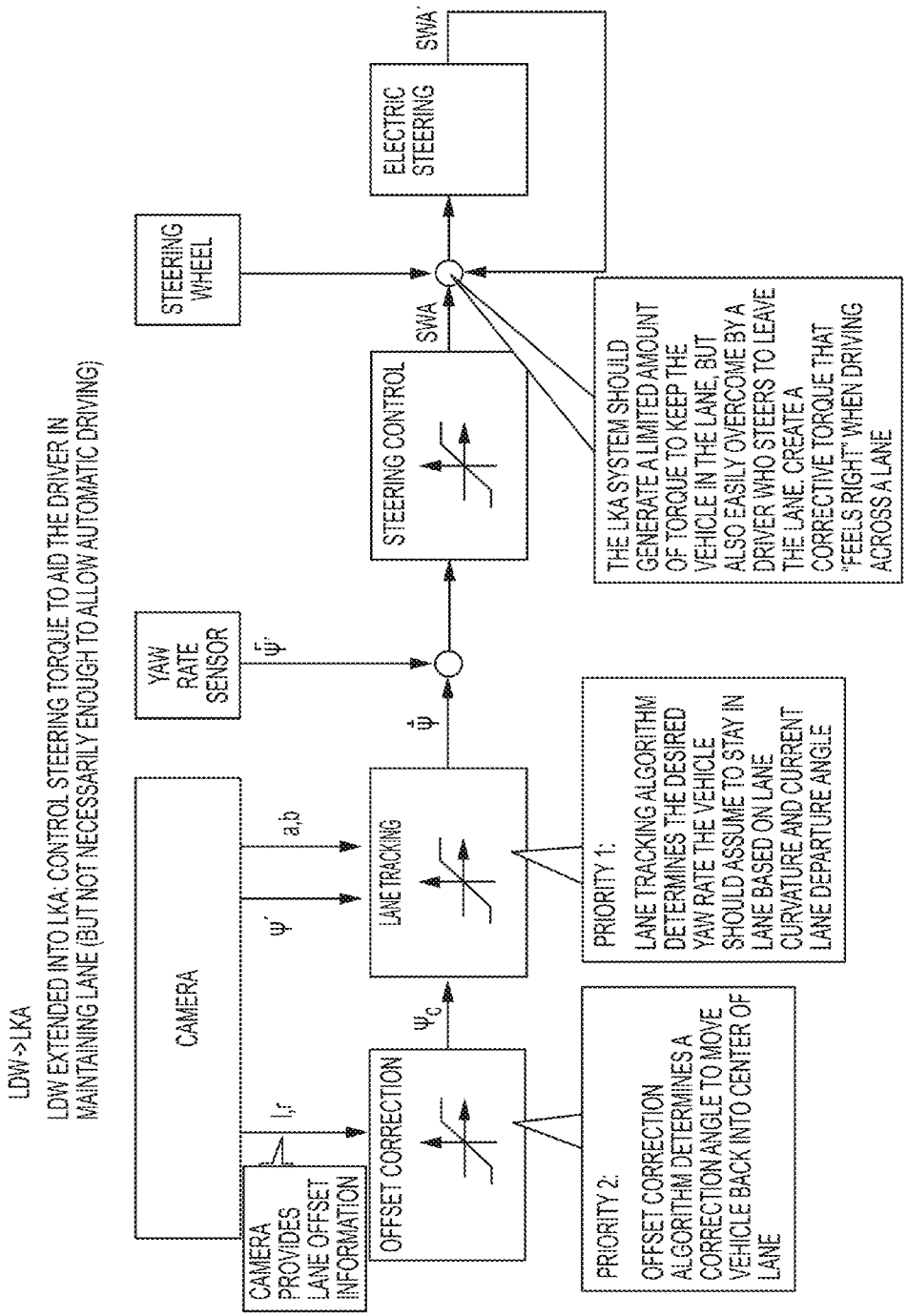
FIG. 14 is a schematic of the interface between the lane departure warning system and the lane keep assist system of the active safety and sensing system of FIG. 11.

Much of the active sensing system builds on the existing alphabet of the vision system foundation that comprises camera-based headlamp control, camera-based lane detection, camera-based sign detection/recognition, camera-based object detection. Optionally, an LDW system or function may be extended to an LKA system or function by tracking the lane along which the vehicle is driven and controlling the steering torque to aid the driver in maintaining the vehicle in the lane, such as shown in FIG. 14. Optionally, the system may include a map input or geographical location input (such as from an onboard or an external GPS-based navigational system), whereby the vehicle safety system may be geographically/locally customized to operate differently or may process the image data differently or the like, in response to the map input or geographical location input indicative of the particular geographical location of the equipped vehicle at that moment in time. Optionally, and preferably, the map data/GPS derived information relating to, for example, the curvature and/or bank angle of a highway exit or entrance ramp may tie into the automatic headlamp control and/or the direction control of the headlamp beam.

Optionally, for example, map data (such as longitude/latitude/altitude coordinates) may be provided in connection with or fused with a TSR system and/or an AHC/ILR system and/or an automatic cruise control (ACC) system to enhance performance of the TSR system and/or the AHC/ILR system and/or the ACC system. For example, the control system may fuse a traffic sign recognition (TSR) function or feature with map data to achieve better speed limit recognition performance. The system may improve or enhance performance such that TSR can be used for automatic ACC target speed setting, ideally in all driving scenarios, such as on controlled access freeways. The system may have defined rules to handle inconsistent information between map data and video image data, and may have a defined interface to the ACC to allow the ACC to receive target speed from or responsive to the video camera. Optionally, for example, an ACC lane assignment may be based on camera lane information, and an improved or enhanced ACC target vehicle lane assignment may be achieved by using front camera lane prediction and/or map data to correct the radar sensor's lane model. Such an approach may make the ACC more accurate and dynamic. The system design and algorithm thus may define the lane curvature interface between the forward facing camera image data and the radar output. Optionally, and with reference to FIG. 15, an AHC/ILR system may be fused with map data to enhance adjustment of the vehicle lights. For example, an AHC/ILR may utilize knowledge of road curvature and slope, and may, for example, predict that disappearing lights of another vehicle are due to the leading vehicle entering a valley or different elevation, whereby the system may recognize that the disappearing lights are likely to reappear shortly. Such AHC/ILR and map data fusion may improve or enhance the AHC/ILR performance beyond the normal capabilities of the forward facing camera and image processor. The system may have defined rules and algorithms as to how to interpret the map data and how to adjust the light control. Optionally, the vehicle may be provided with advanced driver assistance systems (ADAS) map data or the like. The map data or other data or information may be provided to or acquired by the system via any suitable means, such as via software or hardware of the system or via downloading map data or other information or data, such as real time downloading of map data or the like, such as Google Maps map data or the like. Optionally, the system may receive inputs from a Car2Car telematics communication system or a Car2X telematics communication system or the like.

Optionally, camera data or information may be fused with radar data or information (or with other non-vision based data, such as from ultrasonic sensors or infrared sensors or the like) to derive object information and emergency braking may be initiated in response to such object detection. For example, camera and radar information may be fused to derive object information sufficiently accurate to initiate emergency braking. Target information may be merged between radar and camera outputs and any potential synchronicity challenges may be addressed. Optionally, an LKA system and emergency braking system may cooperate to provide semi-autonomous driving, such as by allowing lateral and longitudinal control over the vehicle while the driver is the default redundant vehicle control mechanism with 0 ms latency to assume control (LKA, emergency braking). Such a system may reduce or mitigate problems associated with the driver becoming distracted, and the system may control the vehicle with some latency. It is envisioned that such a control system may allow the driver to read a book or type an email while the car is driving itself, such as on a controlled access freeway or the like. The system may include improved fusion algorithms to include side and/or rear facing sensors, and may include suitable decision algorithms that facilitate autonomous vehicle control.

Optionally, as discussed above, the image processor of the system may comprise an advanced image processing platform, such as, for example, an EyeQX image processing chip, such as an EyeQ2 or an EyeQ1 image processing chip available from Mobileye Vision Technologies Ltd. of Jerusalem, Israel, such as discussed above, and such as shown and described in FIGS. 16, 16A and 16B. Optionally, the advanced image processing platform may provide a new hardware platform to address challenges:
  Address higher Resolution Imagers (such as, for example, a MI-1000 or the like);
  Address a two-box design (for design flexibility, safety requirements, and/or the like);
  Address scalability: define a vehicle video bus to add additional cameras without having to change environmental awareness platform;
  Support new vehicle interfaces, such as, for example, Flexray or the like;
  Solve need for synchronicity and fusion;
  Resolve inefficient use of resources between EyeQ2 and S12X (for example, lots of RAM in EyeQ2 may not be accessible to S12X), may eliminate S12X;
  Address scalability need, for example, EYEQX may be a platform including at least an EYEQX low and an EYEQX high; and/or
  Address need for Autosar compliance and ISO 26262 safety design consequences.

Optionally, on an EYEQX platform, the system may allow writing of code directly on EyeQ (for example, the system may compile, link and load code in EyeQ without need for Mobileye). Optionally, the system may define APIs between system code and Mobileye code on the same processor. Optionally, the vehicle interfaces may be negotiated between the Mobileye and the system. Optionally, they system may include a ST 16-bit micro core added to the EYEQX. Optionally, a Port S12X code may be incorporated onto the EYEQX.

Figure 16:
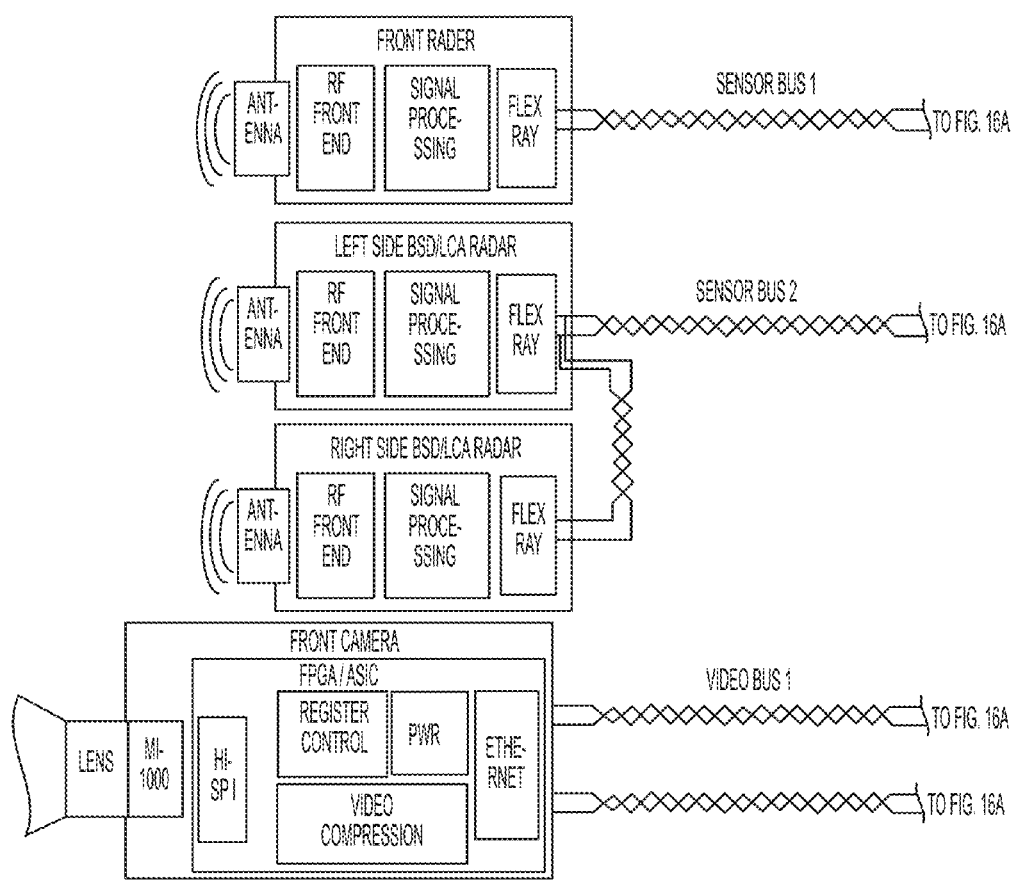
FIGS. 16, 16A and 16B are a schematic of an image processing system architecture suitable for use with the active safety and sensing system of FIG. 11.
Figure 16A:
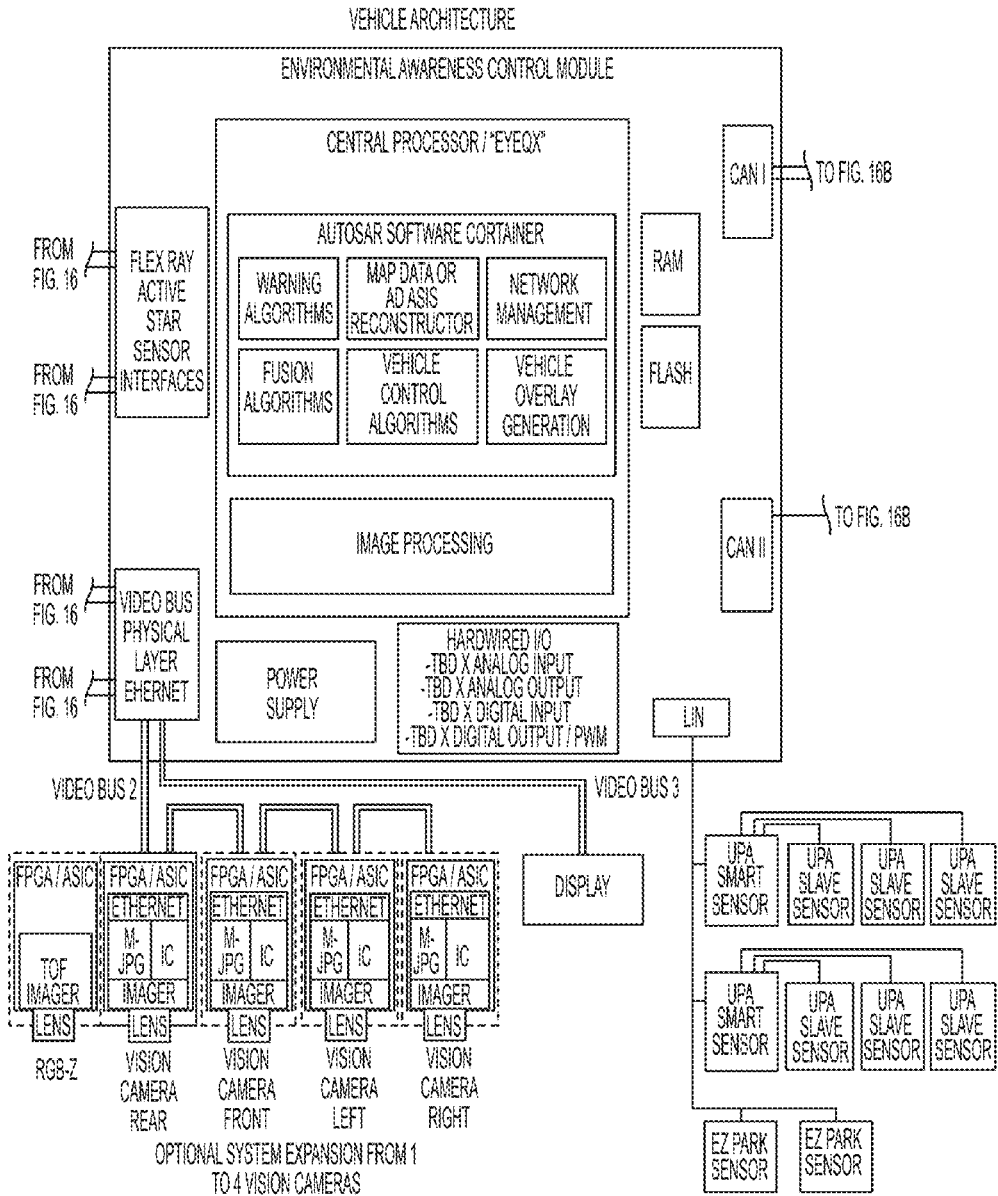
Figure 16B:
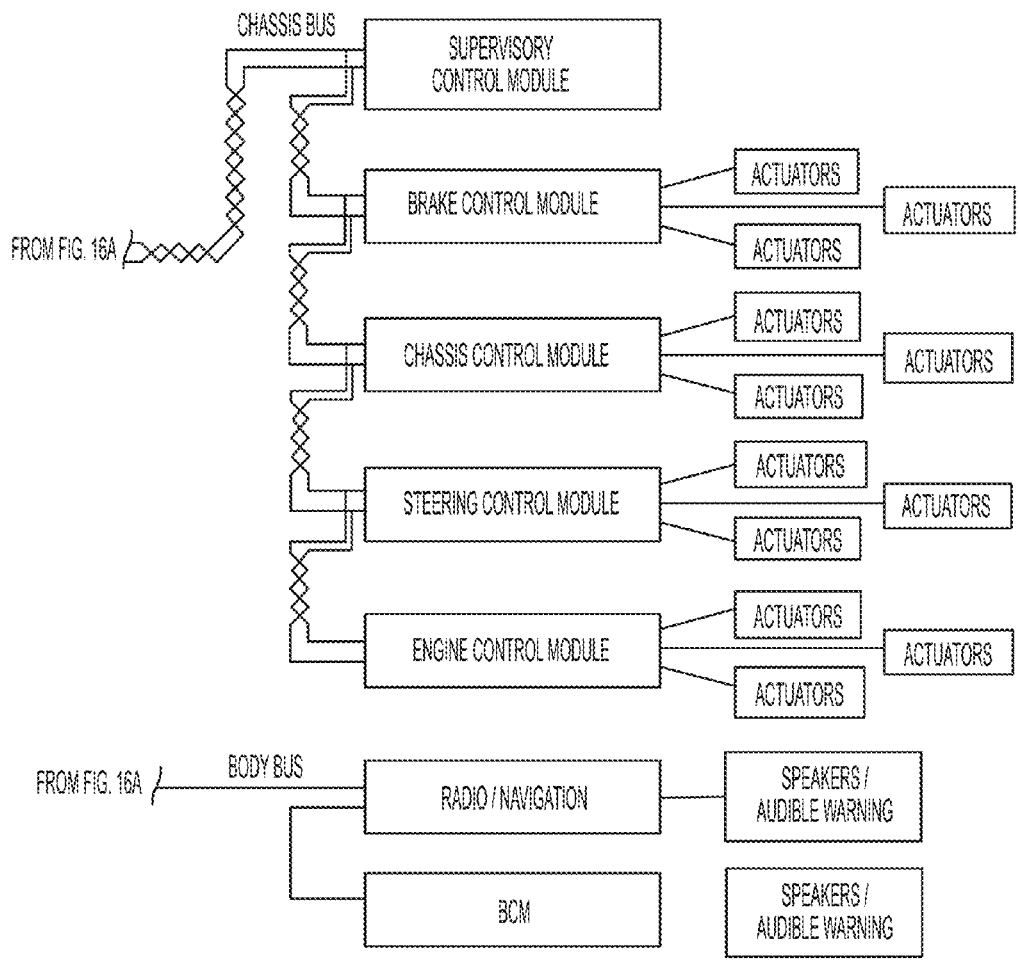

For example, and with reference to FIGS. 16, 16A and 16B, an active safety and sensing and alert system of the present invention may include a control module that includes an environmental awareness control module that is in communication with the sensors and other control modules or systems of the active safety and sensing and alert system and/or of the vehicle, and may include a central processor operable to perform image processing and/or other processing. The system includes a forward facing camera/imager that is in communication with and/or is in connection with the control module or processor, such as via a video bus of the vehicle, such as MOST or the like, or via an Ethernet link that follows an Ethernet protocol or via the likes of a twin wire wired connection carrying the likes of NTSC video signals, and one or more other sensors (such as a front radar sensor and right and left side radar sensors or the like, such as for side object detection functions and/or lane change assist functions) in communication with the control module via one or more sensor buses or the like. Optionally, the system may include additional cameras or image sensors, such as a rearward facing camera and left and right cameras and optionally another forward vision camera and an RGB-Z sensor, which are in communication with the control module via a second video bus of the vehicle. The control module may process the image data and a video display may display video images responsive to the control module. Optionally, the system may include other sensors, such as smart sensors and/or park sensors and/or the like, which may be in communication with the control module via a LIN network of the vehicle or the like.

The control module may include or be operable to perform various functions or algorithms, such as, for example, warning algorithms, fusion algorithms or vehicle control algorithms, or may process or provide map data or AD ASIS reconstructor, network management, or video overlay generation and/or the like. The control module may communicate with one or more vehicle control modules, such as, for example, a supervisory control module, a brake control module, a chassis control module, a steering control module, or an engine control module and/or the like, such as via a chassis bus of the vehicle, whereby the control module may control one or more of the vehicle control modules in response to the image processing or in response to processing of other sensors at the vehicle or in response to other inputs to the control module. The control module may also be in communication with a radio and/or navigation system of the vehicle or a body control module of the vehicle, such as via a body bus of the vehicle, and may, for example, control the speakers of the vehicle to provide an audible warning, such as in response to the image processing or processing of other sensors at the vehicle or other inputs to the control module. Thus, the present invention may provide a single control module and image processor that is operable to process image data and other data or signals received from multiple sensors disposed at the vehicle and may control a video display and/or other control systems of the vehicle in response to such processing and/or in response to other inputs to the control module.

Optionally, the camera or image device or cameras or image devices may comprise a "one-box" design with the imager and associated image processing circuitry closely packaged together in a unit or box, or the camera or image device may comprise a "two-box" design with the imager connected via a wire connection to a second "box" that includes the image processing circuitry, such as by a cable or by a network bus or the like. A "one-box" design, such as with all processing located in the camera, may not be sustainable when adding more features and making safety relevant decisions. The system may utilize any suitable video transfer alternatives (such as, for example, MOST, Firewire, LVDS, USB 2.0, Ethernet and/or the like) with/without lossless compression. The system may include two box communication architecture. Optionally, in developing such a system, a data acquisition hardware and software system may allow for fusion system development, where the system may record multiple sensor data streams (such as from cameras, radar, map data and/or the like) in real time and may be able to synchronously play back for hardware in the loop testing.

Figure 17:
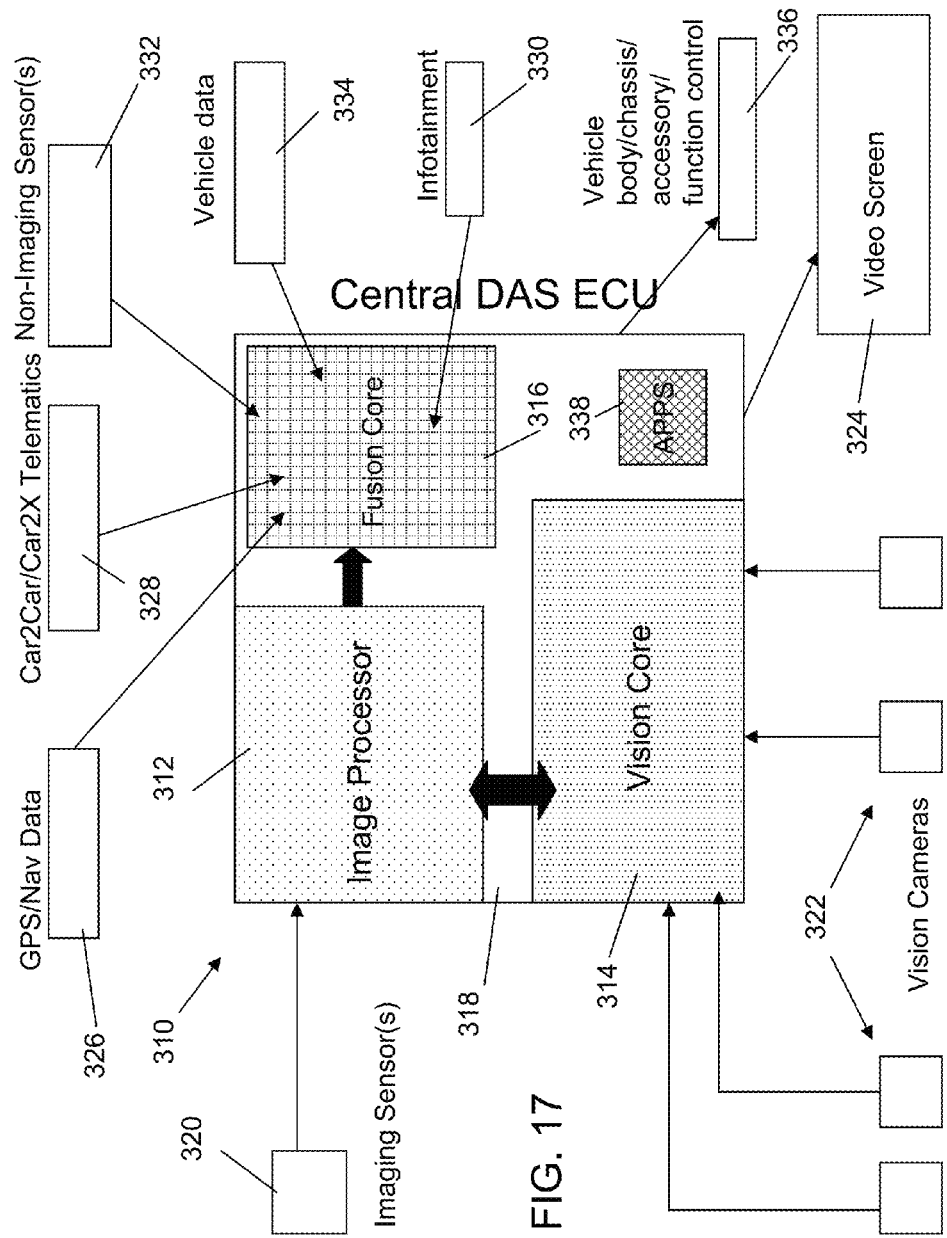
FIG. 17 is a schematic of a system architecture suitable for use with the active safety and sensing system of the present invention.

Optionally, and with reference to FIG. 17, a driver active safety (DAS) control or control module 310 may include an image processor 312, a vision core 314 and a fusion core 316 co-established on and coplanar on a common substrate 318 (such as a common semiconductor wafer or die, such as a silicon semiconductor wafer or die) to provide a central DAS control unit or module for the vehicle. The image processor 312 processes image data received from one or more imaging sensors 320 (such as received from a forward facing camera or imaging sensor and/or a sideward or rearward facing camera or imaging sensor), such as for automatic headlamp control, lane departure warning, traffic sign recognition and/or the like. The vision core 314 may receive data/input from the image processor 312 and may receive image data from one or from a plurality of vision cameras 322 and may manipulate the visual images for displaying the desired or appropriate captured images for viewing by the driver of the vehicle (such as on a video display screen 324 that is responsive to the control module). The common establishment of an image processor and a vision core coplanar on the same or common substrate, and both established at least partially in a common wafer processing step or series of steps, enables economic and packaging friendly miniaturization of the features provided, and minimizes the need and use of ancillary external electrical components, connectors and cabling.

The vision core 314 may process the images (and may superimpose upon them alert or icons or similar graphic overlays based on parallel image processing of the captured image by the image processor) to provide, for example, a panoramic view around the vehicle for viewing by the driver of the vehicle or to provide the likes of a bird's eye view or a surround vision view or an entering traffic cross view or the like for viewing by the driver of the vehicle. The display 324 may comprise any suitable display, such as a video display screen or a backlit liquid crystal display screen or a reconfigurable video display screen or the like. The display may be disposed at the interior rearview mirror and may be viewable through the reflective element (such as a transflective reflective element that is partially transmissive of light therethrough and partially reflective of light incident thereon) by a driver viewing the mirror when the mirror is normally mounted in a vehicle.

The fusion core 316 of the control module 310 may receive inputs from various systems (such as systems of the vehicle or remote from the vehicle), such as a GPS and/or navigational system 326, a Car2Car or Car2X telematics system 328, an infotainment system 330 or the like. The fusion core 316 may also receive inputs from other vehicle or system sensors, such as non-imaging sensors 332, such as radar sensors or infrared sensors or IROD sensors or TOF sensors or ultrasonic sensors or the like, and/or may receive information or data on vehicle status from various vehicle systems or devices 334, such as vehicle speed, vehicle steering wheel angle, yaw rate of the vehicle, type of vehicle, acceleration of the vehicle and/or the like. Optionally, outputs and data from the non-imaging sensors 332 may be received directly by or at the image processor 312 to enhance object detection (useful, for example, for forward collision warning or pedestrian detection or the like) or headlamp control or lane departure warning or the like. The fusion core 316 may receive input and data from the image processor 312 and may fuse this information with input or inputs or data from one or more of the other systems or sensors to enhance the processing and/or decision making and/or control of the control system. Some information may be communicated from the image processor to the fusion core and some information may be communicated from the fusion core to the image processor, depending on the particular function being performed by the control module. Optionally, the fusion core may be incorporated integral to or directly into the construction and architecture of the image processor or the vision core. Optionally, for applications where sensor fusion is not of particular utilization or importance, an image processor and a vision core may be co-established on the common substrate in accordance with the present invention.

As shown in FIG. 17, the control module 310 may provide an output to one or more vehicle controls 336, such as to a vehicle body control module, a vehicle chassis control module, a vehicle accessory control module or other vehicle function control (such as a supervisory control module, a brake control module, a steering control module, or an engine control module) and/or the like, such as via a network bus of the vehicle, such as a safety CAN bus of the vehicle. The control module may control one or more of the vehicle control modules or functions in response to the image processing and/or in response to processing of other sensors at the vehicle or in response to other inputs to the control module, to achieve the likes of pre-crash warning/mitigation, automatic braking, automatic seat belt tensioning and/or the like.

Optionally, the control module 310 may include an application core 338 for hosting other system programs or algorithms or software. For example, this may provide a processor and/or associated memory for operating a variety of software packages that may be particular to a given automaker's or driver's preferences, desires and/or needs. Preferably, a firewall is provided to segregate and separate and protect such applications running on the application core. For example, video and/or text messages may be recorded to and played back from such an application core. For example, and using the likes of a telematics system (such as ONSTAR® or the like), a tour guide function may be downloaded to the application core such that when the driver is driving through, for example, a historic district or nature preserve or the like (or other place of interest), information may be conveyed to the driver (such as audibly or visually) that is particular to a house or location or landmark that is being then passed by the equipped vehicle.

In this regard, the map data may be fused or accessed to assist in determining the location or any such houses or landmarks and/or the relative location of the equipped vehicle.

Thus, the control module of the present invention provides an image processor and vision core on a single circuit chip, and commonly established on the chip and coplanar with one another. The control module thus has a single chip or substrate (such as a silicon substrate) with an image processor and vision core established thereat. The connection to the various sensors and systems and devices of the vehicle may be made via any suitable connecting or communicating means, such as, for example, via a wireless communication link or a wired link, an Ethernet link operating under an Ethernet protocol, and may utilize any suitable communication protocol, such as BLUETOOTH®, SCP, UBP, J1850, CAN J2284, Fire Wire 1394, MOST, LIN, FLEXRAY®, Byte Flight, Autosar and/or the like.

Optionally, and as shown in FIG. 18, an imaging device 410 suitable for use with the alert system and/or active safety and sensing system of the present invention (or for other uses in an overall active safety system of a vehicle) may include a semiconductor substrate 412 (preferably a silicon substrate) with a night vision imaging array 414 configured to be principally sensitive to near infrared radiation and a machine vision imaging array 416 configured to be principally sensitive to visible light, commonly established (such as by CMOS processing) on a common semiconductor substrate or die. The night vision imaging array 414 is configured to be principally sensitive to near infrared (IR) light (and thus may be provided with an IR or near IR pass filter that principally passes near infrared light and that mostly or wholly rejects visible light), while the machine vision imaging array 416 may have a spectral filter(s) 416a, such as an IR reject filter that limits or substantially precludes the sensor from being flooded by IR radiation and/or a spectrally selective filter (such as a RGB filter or a red/clear filter or the like) that selectively transmits the likes of red visible light to assist machine vision recognition and discrimination of the likes of headlamps and taillights and stop signs and/or the like.

The two distinct imagers (a night vision imaging array that typically is sensitive to IR light and has a IR pass filter to reject and not be sensitive to and saturated by visible light and a machine vision imaging array that has an IR reject filter and may have an RGB filter or a red/clear filter to provide color discrimination) are disposed on the same or common substrate 412 or may be disposed in front of or at the common substrate, and each imager may have a respective lens 414a, 416b disposed thereat. An image processor 418 is also disposed on or at the same or common substrate 412 (and may be created or established thereat such as by CMOS processing in the same chip manufacturing process as is the imaging arrays), along with miscellaneous circuitry 420, such as memory, an A/D converter, a D/A converter, CAN controllers and/or the like. The imaging device thus has two imaging arrays and/or an image processor and/or ancillary miscellaneous circuitry on or at the same substrate or chip, so that a single chip may provide imaging with two distinct imagers and/or a single chip may provide image processing circuitry on the same substrate or chip as one or more imagers or imaging arrays, so as to provide vision capabilities and/or image processing on one substrate instead of having two separate imaging devices.

The video display screen device or module may comprise any suitable type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,446,650; 7,370,983; 7,338,177; 7,274,501; 7,255,451; 7,195,381; 7,184,190; 7,012,727; 6,902,284; 6,690,268; 6,428,172; 6,420,975; 5,668,663 and/or 5,724,187, and/or U.S. patent applications, Ser. No. 12/414,190, filed Mar. 30, 2009, now U.S. Pat. No. 8,154,418; Ser. No. 10/538,724, filed Jun. 13, 2005 and published Mar. 9, 2006 as U.S. Patent Publication No. US 2006/0050018; Ser. No. 11/226,628, filed Sep. 14, 2005 and published Mar. 23, 2006 as U.S. Publication No. US 2006-061008; Ser. No. 12/091,525, filed Apr. 25, 2008, now U.S. Pat. No. 7,855,755; Ser. No. 09/585,379, filed Jun. 1, 2000; and/or Ser. No. 12/578,732, filed Oct. 14, 2009 and published Apr. 22, 2010 as U.S. Publication No. US-2010-0097469, which are hereby incorporated herein by reference in their entireties. Optionally, video displays may be disposed at the rearview mirror assemblies and may be operable to display video images of the rearward scene, such as by utilizing aspects of the displays described in U.S. patent application Ser. No. 11/933,697, filed Nov. 1, 2007, now U.S. Pat. No. 7,777,611, which is hereby incorporated herein by reference in its entirety. Each mirror thus may provide a video display (such as including a video display screen disposed behind and viewable through a transflector or transflective mirror reflector of a reflective element) and the display may be larger if provided as a display-on-demand type of display behind a transflective mirror reflector of the reflective element and viewable through the transflective mirror reflector of the reflective element.

Optionally, the video display module may provide a graphic overlay to enhance the driver's cognitive awareness of the distances to objects to the rear of the vehicle (such as by utilizing aspects of the systems described in U.S. Pat. Nos. 5,670,935; 5,949,331; 6,222,447; and 6,611,202; and/or PCT Application No. PCT/US08/76022, filed Sep. 11, 2008, which are hereby incorporated herein by reference in their entireties. Such graphic overlays may be generated at or by the camera circuitry or the mirror or display circuitry. Optionally, the display module may comprise a high luminance 3.5 inch video display or a 4.3 inch video display, preferably having a display intensity of at least about 400 candelas per square meter ($cd/m^2$) as viewed through the reflective element (preferably as viewed through a transflective mirror reflector of the transflective reflective element) by a person viewing the mirror reflective element, more preferably at least about 1000 $cd/m^2$ as viewed through the reflective element (preferably as viewed through a transflective mirror reflector of the transflective reflective element) by a person viewing the mirror reflective element, and more preferably at least about 1500 $cd/m^2$ as viewed through the reflective element (preferably as viewed through a transflective mirror reflector of the transflective reflective element) by a person viewing the mirror reflective element.

The imaging device and control and image processor may comprise any suitable components, and may utilize aspects of the cameras and vision systems described in U.S. Pat.

Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or U.S. patent application Ser. No. 12/508,840, filed Jul. 24, 2009 and published Jan. 28, 2010 as U.S. Publication No. US-2010-0020170, and/or U.S. provisional applications, Ser. No. 61/303,054, filed Feb. 10, 2010; Ser. No. 61/785,565, filed May 15, 2009; Ser. No. 61/186,573, filed Jun. 12, 2009; and/or Ser. No. 61/238,862, filed Sep. 1, 2009, which are all hereby incorporated herein by reference in their entireties. Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. patent application Ser. No. 11/226,628, filed Sep. 14, 2005 and published Mar. 23, 2006 as U.S. Publication No. US 2006-0061008, which are hereby incorporated herein by reference in their entireties. The camera or camera module may comprise any suitable camera or imaging sensor, and may utilize aspects of the cameras or sensors described in U.S. Pat. No. 7,480,149 and/or U.S. patent applications, Ser. No. 12/091,359, filed Apr. 24, 2008 and published Oct. 1, 2009 as U.S. Publication No. US 2009-0244361; and/or Ser. No. 10/534,632, filed May 11, 2005 and published Aug. 3, 2006 as U.S. Patent Publication No. US-2006-0171704, now U.S. Pat. No. 7,965,336, and/or U.S. provisional application Ser. No. 61/303,054, filed Feb. 10, 2010, which are all hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; and 7,004,606; and/or U.S. patent application Ser. No. 11/315,675, filed Dec. 22, 2005, now U.S. Pat. No. 7,720,580; and/or PCT Application No. PCT/US2003/036177 filed Nov. 14, 2003, and published Jun. 3, 2004 as PCT Publication No. WO 2004/047421, and/or PCT Application No. PCT/US2008/076022, filed Sep. 11, 2008, and/or PCT Application No. PCT/US2008/078700, filed Oct. 3, 2008, which are all hereby incorporated herein by reference in their entireties.

The camera module and circuit chip or board and imaging sensor of the present invention may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; and 7,339,149, and U.S. patent application Ser. No. 11/105,757, filed Apr. 14, 2005, now U.S. Pat. No. 7,526,103, and U.S. provisional application Ser. No. 61/785,565, filed May 15, 2009, which are all hereby incorporated herein by reference in their entireties, a rain sensor, such as the types disclosed in commonly assigned U.S. Pat. Nos. 6,353,392; 6,313,454; and/or 6,320,176; and/or U.S. patent application, Ser. No. 11/201,661, filed Aug. 11, 2005, now U.S. Pat. No. 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,205,904; and 7,355,524, and/or in U.S. patent application Ser. No. 10/643,602, filed Aug. 19, 2003, now U.S. Pat. No. 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,355,524; 7,205,904; 7,038,577; 5,929,786 and/or 5,786,772, and/or U.S. patent applications, Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004; and/or Ser. No. 61/238,862, filed Sep. 1, 2009, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or PCT Application No. PCT/US03/40611, filed Dec. 19, 2003 and published Jul. 15, 2004 as PCT Publication No. WO 2004/058540, and/or U.S. patent application Ser. No. 10/538,724, filed Jun. 13, 2005 and published Mar. 9, 2006 as U.S. Publication No. US-2006-0050018, and/or U.S. provisional applications, Ser. No. 60/630,061, filed Nov. 22, 2004; and Ser. No. 60/667,048, filed Mar. 31, 2005, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. patent applications, Ser. No. 11/201,661, filed Aug. 11, 2005, now U.S. Pat. No. 7,480,149; and/or Ser. No. 11/226,628, filed Sep. 14, 2005 and published Mar. 23, 2006 as U.S. Publication No. US 2006-0061008, which are hereby incorporated herein by reference in their entireties.

Optionally, the interior and/or exterior mirror assemblies may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent applications, Ser. No. 11/226,628, filed Sep. 14, 2005 and published Mar. 23, 2006 as U.S. Publication No. US 2006-0061008; Ser. No. 10/538,724, filed Jun. 13, 2005 and published Mar. 9, 2006 as U.S. Patent Publication No. US 2006/0050018; and/or Ser. No. 11/912,576, filed Oct. 25, 2007, now U.S. Pat. No. 7,626,749, and/or PCT Application No. PCT/US03/29776, filed Sep. 9, 2003 and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, and in PCT Application No. PCT/US03/29776, filed Sep. 9, 2003 and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371; and 4,435,042; and PCT Application No. PCT/US2004/015424, filed May 18, 2004, and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177; and/or 7,255,451, and/or PCT Application No. PCT/US03/29776, filed Sep. 19, 2003, and published Apr. 1, 2004 as International Publication No. WO 2004/026633; and/or PCT Application No. PCT/US2004/015424, filed May 18, 2004, and published on Dec. 2, 2004, as International Publication No. WO 2004/103772; and U.S. provisional application, Ser. No. 60/525,952, filed Nov. 26, 2003, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assembly and/or reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,195,381; 6,690,298; 5,668,663 and/or 5,724,187, and/or in U.S. patent applications, Ser. No. 11/226,628, filed Sep. 14, 2005 and published Mar. 23, 2006 as U.S. Publication No. US-2006-0061008; and/or Ser. No. 10/993,302, filed Nov. 19, 2004, now U.S. Pat. No. 7,338,177; and/or in U.S. provisional applications, Ser. No. 60/525,952, filed Nov. 26, 2003; Ser. No. 60/717,093, filed Sep. 14, 2005; and/or Ser. No. 60/732,245, filed Nov. 1, 2005, and/or in PCT Application No. PCT/US03/29776, filed Sep. 19, 2003, and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003, and published Apr. 1, 2004 as International Publication No. WO 2004/026633; and/or U.S. patent application, Ser. No. 10/993,302, filed Nov. 19, 2004, now U.S. Pat. No. 7,338,177; and/or U.S. provisional application, Ser. No. 60/525,952, filed Nov. 26, 2003, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,824,281; 6,690,268; 6,672,744; 6,386,742; and 6,124,886, and/or, and/or PCT Application No. PCT/US03/03012, filed Jan. 31, 2003, and published Aug. 7, 2003 as International Publication No. WO 03/065084, and/or PCT Application No. PCT/US03/40611, filed Dec. 19, 2003, and published Jul. 15, 2004 as International Publication No. WO 2004/058540, and/or PCT Application No. PCT/US04/15424, filed May 18, 2004, and published on Dec. 2, 2004, as International Publication No. WO 2004/103772, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A driver active safety control system for a vehicle, said driver active safety control system comprising:
   a plurality of image capture sensors configured to be disposed at a vehicle equipped with said driver active safety control system so as to have respective fields of view exterior of the equipped vehicle;

wherein said plurality of image capture sensors comprises at least (i) a forward viewing image capture sensor configured to be disposed at the equipped vehicle so as to have a forward field of view in a direction of forward travel of the equipped vehicle, (ii) a rearward viewing image capture sensor configured to be disposed at the equipped vehicle so as to have a rearward field of view in a direction of rearward travel of the equipped vehicle, (iii) a driver-side sideward viewing image capture sensor configured to be disposed at a driver side of the body of the equipped vehicle so as to have a driver-side sideward field of view sideward of the equipped vehicle and (iv) a passenger-side sideward viewing image capture sensor configured to be disposed at a passenger side of the body of the equipped vehicle so as to have a passenger-side sideward field of view sideward of the equipped vehicle;

a video display screen for displaying video images derived from image data captured at least by said rearward viewing image capture sensor, said driver-side sideward viewing image capture sensor and said passenger-side sideward viewing image capture sensor of said plurality of image capture sensors, wherein said video display screen is viewable by a driver of a vehicle equipped with said driver active safety control system;

a central driver active safety control module;

wherein said central driver active safety control module at least comprises an image processor, a vision core and a fusion core;

wherein image data captured by said plurality of image capture sensors is provided to said central driver active safety control module;

wherein said image processor processes, via machine vision analysis, image data captured by and received from at least said forward viewing image capture sensor for at least one of (i) automatic headlamp control, (ii) lane departure warning and (iii) traffic sign recognition;

wherein said vision core is operable to manipulate image data captured by and received at least from said rearward viewing image capture sensor, said driver-side sideward viewing image capture sensor and said passenger-side sideward viewing image capture sensor of said plurality of image capture sensors to form said video images for displaying on said video display screen for viewing by the driver of the equipped vehicle;

at least one non-imaging sensor configured to be disposed at the equipped vehicle and sensing exterior the equipped vehicle;

wherein sensor data captured by said at least one non-imaging sensor is provided to said central driver active safety control module;

wherein said fusion core at least receives (a) input from said image processor, (b) input from said vision core and (c) input from said at least one non-imaging sensor;

wherein said fusion core receives input from at least one of (i) a global positioning system, (ii) a telematics system, (iii) a Car2Car communication system and (iv) a Car2X communication system;

wherein said fusion core receives vehicle data relating to operation of the equipped vehicle, said vehicle data comprising at least one of (i) vehicle speed data, (ii) vehicle steering wheel angle data, (iii) vehicle yaw rate data, (iv) vehicle type data and (v) vehicle acceleration data;

wherein said fusion core is operable to process vehicle data and inputs received (a) from said image processor, (b) from said vision core, (c) from said at least one non-imaging sensor and (d) from at least one of (i) a global positioning system, (ii) a telematics system, (iii) a Car2Car communication system and (iv) a Car2X communication system to enhance control by said central driver active safety control module of a driver assistance system of the equipped vehicle; and wherein, responsive at least in part to processing by said central driver active safety control module of at least one selected from the group consisting of (i) captured image data and (ii) captured sensor data, presence of an object rearward of the equipped vehicle is determined.

2. The driver active safety control system of claim 1, wherein at least two of said image processor, said vision core and said fusion core are co-established on a common substrate.

3. The driver active safety control system of claim 1, wherein said image processor processes image data captured by said rearward viewing image capture sensor for object detection rearward of the equipped vehicle, and wherein, during a reversing maneuver of the equipped vehicle and responsive to processing by said central driver active safety control module of captured image data and captured sensor data, presence of an object rearward of the equipped vehicle is determined.

4. The driver active safety control system of claim 1, wherein said non-imaging sensor comprises part of at least one of (a) a radar sensing system having at least one radar sensor at the rear of the equipped vehicle, (b) an ultrasonic sensing system having at least one ultrasonic sensor at the rear of the equipped vehicle, and (c) a lidar sensing system having at least one lidar sensor at the rear of the equipped vehicle.

5. The driver active safety control system of claim 1, wherein said non-imaging sensor comprises a sensor selected from the group consisting of (i) a radar sensor, (ii) an infrared sensor, (iii) an IROD sensor, (iv) a lidar sensor and (v) an ultrasonic sensor.

6. The driver active safety control system of claim 1, wherein said non-imaging sensor comprises a three dimensional sensing sensor.

7. The driver active safety control system of claim 1, wherein said non-imaging sensor comprises an array of infrared emitting light emitting diodes.

8. The driver active safety control system of claim 1, wherein said non-imaging sensor comprises a scanning sensor.

9. The driver active safety control system of claim 1, wherein said image processor processes image data to determine a driving situation and wherein, in determining said driving situation, said fusion core processes sensor data to augment processing of image data by said image processor.

10. The driver active safety control system of claim 1, wherein at least two of said image processor, said vision core and said fusion core are co-established on a common semiconductor substrate.

11. The driver active safety control system of claim 1, wherein captured image data is communicated to said central driver active safety control module via at least one Ethernet link.

12. The driver active safety control system of claim 1, wherein said central driver active safety control module, responsive to a geographical location of the equipped vehicle as determined by a global positioning system, at least in part controls said driver assistance system.

13. The driver active safety control system of claim 1, wherein said vision core processes image data to generate a bird's eye view of a region exterior the equipped vehicle for displaying on said video display screen.

14. The driver active safety control system of claim 13, wherein said vision core is operable, responsive to detection of an object external of the equipped vehicle by said central driver active safety control module, to generate a graphic overlay on the displayed bird's eye view image.

15. The driver active safety control system of claim 1, wherein said central driver active safety control module generates an output for at least one vehicle control.

16. The driver active safety control system of claim 15, wherein said at least one vehicle control comprises at least one of (i) a vehicle body control, (ii) a vehicle chassis control, (iii) a vehicle supervisory control, (iv) a vehicle brake control, (v) a vehicle steering control and (vi) a vehicle engine control.

17. The driver active safety control system of claim 15, wherein said central driver active safety control module controls said at least one vehicle control responsive at least in part to image processing of image data captured by said plurality of image capture sensors and responsive at least in part to processing of sensor data captured by said at least one non-imaging sensor.

18. The driver active safety control system of claim 1, wherein said image processor, said vision core and said fusion core are co-established on a common substrate.

19. The driver active safety control system of claim 1, wherein said driver assistance system comprises automatic emergency braking.

20. The driver active safety control system of claim 19, wherein said forward viewing image capture sensor is disposed in the equipped vehicle and behind a windshield of the equipped vehicle.

21. A driver active safety control system for a vehicle, said driver active safety control system comprising:
a plurality of image capture sensors configured to be disposed at a vehicle equipped with said driver active safety control system so as to have respective fields of view exterior of the equipped vehicle;
wherein said plurality of image capture sensors comprises at least (i) a forward viewing image capture sensor configured to be disposed at the equipped vehicle so as to have a forward field of view in a direction of forward travel of the equipped vehicle, (ii) a rearward viewing image capture sensor configured to be disposed at the equipped vehicle so as to have a rearward field of view in a direction of rearward travel of the equipped vehicle, (iii) a driver-side sideward viewing image capture sensor configured to be disposed at a driver side of the body of the equipped vehicle so as to have a driver-side sideward field of view sideward of the equipped vehicle and (iv) a passenger-side sideward viewing image capture sensor configured to be disposed at a passenger side of the body of the equipped vehicle so as to have a passenger-side sideward field of view sideward of the equipped vehicle;
a video display screen for displaying video images derived from image data captured at least by said rearward viewing image capture sensor, said driver-side sideward viewing image capture sensor and said passenger-side sideward viewing image capture sensor of said plurality of image capture sensors, wherein said video display screen is viewable by a driver of a vehicle equipped with said driver active safety control system;
a central driver active safety control module;
wherein said central driver active safety control module at least comprises an image processor, a vision core and a fusion core;
wherein image data captured by said plurality of image capture sensors is provided to said central driver active safety control module;
wherein said image processor processes, via machine vision analysis, image data captured by and received from at least said forward viewing image capture sensor for at least one of (i) automatic headlamp control, (ii) lane departure warning and (iii) traffic sign recognition;
wherein said vision core is operable to manipulate image data captured by and received from at least said rearward viewing image capture sensor, said driver-side sideward viewing image capture sensor and said passenger-side sideward viewing image capture sensor of said plurality of image capture sensors to form said video images for displaying on said video display screen for viewing by the driver of the equipped vehicle;
at least one non-imaging sensor configured to be disposed at the equipped vehicle and sensing exterior the equipped vehicle;
wherein said non-imaging sensor comprises a three dimensional sensing sensor;
wherein sensor data captured by said at least one non-imaging sensor is provided to said central driver active safety control module;
wherein said fusion core at least receives (a) input from said image processor, (b) input from said vision core and (c) input from said at least one non-imaging sensor;
wherein said fusion core receives input from at least one of (i) a global positioning system, (ii) a telematics system, (iii) a Car2Car communication system and (iv) a Car2X communication system;
wherein said fusion core receives vehicle data relating to operation of the equipped vehicle, said vehicle data comprising at least one of (i) vehicle speed data, (ii) vehicle steering wheel angle data, (iii) vehicle yaw rate data, (iv) vehicle type data and (v) vehicle acceleration data;
wherein said fusion core is operable to process vehicle data and inputs received (a) from said image processor, (b) from said vision core, (c) from said at least one non-imaging sensor and (d) from at least one of (i) a global positioning system, (ii) a telematics system, (iii) a Car2Car communication system and (iv) a Car2X communication system to enhance control by said central driver active safety control module of a driver assistance system of the equipped vehicle;
wherein said central driver active safety control module generates an output for at least one vehicle control;
wherein, responsive at least in part to processing by said central driver active safety control module of at least one selected from the group consisting of (i) captured image data and (ii) captured sensor data, presence of an object rearward of the equipped vehicle is determined.

22. The driver active safety control system of claim 21, wherein said non-imaging sensor comprises a lidar sensor.

23. The driver active safety control system of claim 22, wherein said non-imaging sensor comprises a scanning sensor.

24. The driver active safety control system of claim 21, wherein said central driver active safety control module, responsive to a geographical location of the equipped vehicle as determined by a global positioning system, at least in part controls said driver assistance system.

25. The driver active safety control system of claim 21, wherein said vision core processes image data to generate a bird's eye view of a region exterior the equipped vehicle for displaying on said video display screen.

26. The driver active safety control system of claim 25, wherein said vision core is operable, responsive to detection of an object external of the equipped vehicle by said central driver active safety control module, to generate a graphic overlay on the displayed bird's eye view image.

27. The driver active safety control system of claim 21, wherein said at least one vehicle control comprises at least one of (i) a vehicle body control, (ii) a vehicle chassis control, (iii) a vehicle supervisory control, (iv) a vehicle brake control, (v) a vehicle steering control and (vi) a vehicle engine control.

28. A driver active safety control system for a vehicle, said driver active safety control system comprising:
- a plurality of image capture sensors configured to be disposed at a vehicle equipped with said driver active safety control system so as to have respective fields of view exterior of the equipped vehicle;
- wherein said plurality of image capture sensors comprises at least (i) a forward viewing image capture sensor configured to be disposed at the equipped vehicle so as to have a forward field of view in a direction of forward travel of the equipped vehicle, (ii) a rearward viewing image capture sensor configured to be disposed at the equipped vehicle so as to have a rearward field of view in a direction of rearward travel of the equipped vehicle, (iii) a driver-side sideward viewing image capture sensor configured to be disposed at a driver side of the body of the equipped vehicle so as to have a driver-side sideward field of view sideward of the equipped vehicle and (iv) a passenger-side sideward viewing image capture sensor configured to be disposed at a passenger side of the body of the equipped vehicle so as to have a passenger-side sideward field of view sideward of the equipped vehicle;
- a video display screen for displaying video images derived from image data captured at least by said rearward viewing image capture sensor, said driver-side sideward viewing image capture sensor and said passenger-side sideward viewing image capture sensor of said plurality of image capture sensors, wherein said video display screen is viewable by a driver of a vehicle equipped with said driver active safety control system;
- wherein said vision core processes image data to generate a bird's eye view of a region exterior the equipped vehicle for displaying on said video display screen;
- a central driver active safety control module;
- wherein said central driver active safety control module at least comprises an image processor, a vision core and a fusion core;
- wherein image data captured by said plurality of image capture sensors is provided to said central driver active safety control module;
- wherein said image processor processes, via machine vision analysis, image data captured by and received from at least said forward viewing image capture sensor for at least one of (i) automatic headlamp control, (ii) lane departure warning and (iii) traffic sign recognition;
- wherein said vision core is operable to manipulate image data captured by and received from at least said rearward viewing image capture sensor, said driver-side sideward viewing image capture sensor and said passenger-side sideward viewing image capture sensor of said plurality of image capture sensors to form said video images for displaying on said video display screen for viewing by the driver of the equipped vehicle;
- at least one non-imaging sensor configured to be disposed at the equipped vehicle and sensing exterior the equipped vehicle;
- wherein said non-imaging sensor comprises a three dimensional sensing sensor and wherein said three dimensional sensing sensor comprises a lidar sensor;
- wherein sensor data captured by said at least one non-imaging sensor is provided to said central driver active safety control module;
- wherein said fusion core at least receives (a) input from said image processor, (b) input from said vision core and (c) input from said at least one non-imaging sensor;
- wherein said fusion core receives input from at least one of (i) a global positioning system, (ii) a telematics system, (iii) a Car2Car communication system and (iv) a Car2X communication system;
- wherein said fusion core receives vehicle data relating to operation of the equipped vehicle, said vehicle data comprising at least one of (i) vehicle speed data, (ii) vehicle steering wheel angle data, (iii) vehicle yaw rate data, (iv) vehicle type data and (v) vehicle acceleration data;
- wherein said fusion core is operable to process vehicle data and inputs received (a) from said image processor, (b) from said vision core, (c) from said at least one non-imaging sensor and (d) from at least one of (i) a global positioning system, (ii) a telematics system, (iii) a Car2Car communication system and (iv) a Car2X communication system to enhance control by said central driver active safety control module of a driver assistance system of the equipped vehicle;
- wherein said central driver active safety control module generates an output for at least one vehicle control; and
- wherein, responsive at least in part to processing by said central driver active safety control module of at least one selected from the group consisting of (i) captured image data and (ii) captured sensor data, presence of an object rearward of the equipped vehicle is determined.

29. The driver active safety control system of claim 28, wherein said non-imaging sensor comprises a scanning sensor.

30. The driver active safety control system of claim 28, wherein said central driver active safety control module, responsive to a geographical location of the equipped vehicle as determined by a global positioning system, at least in part controls said driver assistance system.

31. The driver active safety control system of claim 28, wherein said vision core is operable, responsive to detection of an object external of the equipped vehicle by said central driver active safety control module, to generate a graphic overlay on the displayed bird's eye view image.

32. The driver active safety control system of claim 28, wherein said at least one vehicle control comprises at least one of (i) a vehicle body control, (ii) a vehicle chassis control, (iii) a vehicle supervisory control, (iv) a vehicle brake control, (v) a vehicle steering control and (vi) a vehicle engine control.

* * * * *